(12) United States Patent
Szerszen et al.

(10) Patent No.: US 11,783,530 B2
(45) Date of Patent: Oct. 10, 2023

(54) APPARATUS AND METHOD FOR QUANTIZED CONVERGENT DIRECTION-BASED RAY SORTING

(71) Applicant: INTEL CORPORATION, Santa Clara, CA (US)

(72) Inventors: Karol Szerszen, Hillsboro, CA (US); Prasoonkumar Surti, Folsom, CA (US); Gabor Liktor, San Francisco, CA (US); Karthik Vaidyanathan, San Francisco, CA (US); Sven Woop, Voelklingen (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/677,109

(22) Filed: Feb. 22, 2022

(65) Prior Publication Data

US 2022/0262063 A1    Aug. 18, 2022

Related U.S. Application Data

(63) Continuation of application No. 16/728,375, filed on Dec. 27, 2019, now Pat. No. 11,263,800.

(51) Int. Cl.
| | |
|---|---|
| *G06T 15/00* | (2011.01) |
| *G06T 15/06* | (2011.01) |
| *G06T 15/08* | (2011.01) |
| *G06T 1/20* | (2006.01) |
| *G06T 17/10* | (2006.01) |

(52) U.S. Cl.
CPC .............. *G06T 15/06* (2013.01); *G06T 1/20* (2013.01); *G06T 15/005* (2013.01); *G06T 15/08* (2013.01); *G06T 17/10* (2013.01)

(58) Field of Classification Search
None
See application file for complete search history.

(56) References Cited

U.S. PATENT DOCUMENTS

| | | |
|---|---|---|
| 2004/0125103 A1 | 7/2004 | Kaufman et al. |
| 2009/0096788 A1 | 4/2009 | Salsbury et al. |
| 2009/0167763 A1 | 7/2009 | Waechter et al. |
| 2009/0262132 A1 | 10/2009 | Peterson et al. |
| 2010/0073369 A1 | 3/2010 | Mccombe et al. |
| 2010/0141652 A1 | 6/2010 | Nutter et al. |
| 2011/0032257 A1 | 2/2011 | Peterson et al. |
| 2011/0080403 A1 | 4/2011 | Ernst et al. |
| 2011/0234583 A1 | 9/2011 | Bakalash |

(Continued)

OTHER PUBLICATIONS

Office Action, IN App. No. 202044039477, dated May 20, 2022, 7 pages of Original Document Only.

(Continued)

*Primary Examiner* — Martin Mushambo
(74) *Attorney, Agent, or Firm* — NICHOLSON DE VOS WEBSTER & ELLIOTT LLP

(57) ABSTRACT

Apparatus and method for grouping rays based on quantized ray directions. For example, one embodiment of an apparatus comprises: An apparatus comprising: a ray generator to generate a plurality of rays; ray direction evaluation circuitry/logic to generate approximate ray direction data for each of the plurality of rays; ray sorting circuitry/logic to sort the rays into a plurality of ray queues based, at least in part, on the approximate ray direction data.

15 Claims, 36 Drawing Sheets

(56) References Cited

U.S. PATENT DOCUMENTS

| | | | |
|---|---|---|---|
| 2012/0133654 A1 | 5/2012 | Redgrave et al. | |
| 2012/0139926 A1 | 6/2012 | Clohset et al. | |
| 2015/0123971 A1* | 5/2015 | Lee | G06T 15/06 |
| | | | 345/426 |
| 2015/0325033 A1 | 11/2015 | Bakalash | |
| 2016/0019672 A1 | 1/2016 | Bakalash | |
| 2016/0260247 A1 | 9/2016 | Fursund et al. | |
| 2016/0350960 A1* | 12/2016 | Yi | G06T 15/06 |
| 2017/0178398 A1 | 6/2017 | Afra et al. | |
| 2017/0236325 A1 | 8/2017 | Lecocq et al. | |
| 2017/0301129 A1 | 10/2017 | Seo et al. | |
| 2018/0373809 A1 | 12/2018 | Ylitie et al. | |
| 2019/0035138 A1 | 1/2019 | Fuetterling | |

OTHER PUBLICATIONS

Final Office Action, U.S. Appl. No. 16/728,375, dated Aug. 19, 2021, 10 pages.
Laine, Samuli, "Restart Trail for Stackless BVH Traversal", NVIDIA Research, High Performance Graphics (2010), The Eurographics Association 2010, 2010, 5 pages.
Non-Final Office Action, U.S. Appl. No. 16/728,375, dated Mar. 4, 2021, 12 pages.
Notice of Allowance, U.S. Appl. No. 16/728,375, dated Oct. 25, 2021, 8 pages.

* cited by examiner

GRAPHICS PROCESSOR INSTRUCTION FORMATS
700

128-BIT INSTRUCTION
710

64-BIT COMPACT INSTRUCTION
730

OPCODE DECODE
740 opcode=000xxxxxb ← Move/Logic - 742 opcode=0010xxxxb ← Miscellaneous - 746 opcode=0011xxxxb ← Flow Control - 744 opcode=0100xxxxb ← Parallel Math - 748 opcode=0101xxxxb ← Vector Math - 750

SORT KEY 2600

| | Intersection Key 2602 | | | | | Shader Record Key 2601 |
|---|---|---|---|---|---|---|
| | U[0] | V[0] | U[1] | V[1] | U[2] | V[2] | Side ID [1:0] | SRI [31:0] |
| Sort Key Bits | [39] | [38] | [37] | [36] | [35] | [34] | [33:32] | [31:0] |

FIG. 26

APPARATUS AND METHOD FOR QUANTIZED CONVERGENT DIRECTION-BASED RAY SORTING

CROSS-REFERENCE TO RELATED APPLICATIONS

This application is a continuation of application Ser. No. 16/728,375, filed Dec. 27, 2019, which is hereby incorporated by reference.

TECHNICAL FIELD

This invention relates generally to the field of graphics processors. More particularly, the invention relates to an apparatus and method for quantized convergent direction-based ray sorting.

BACKGROUND ART

Ray tracing is a technique in which a light transport is simulated through physically-based rendering. Widely used in cinematic rendering, it was considered too resource-intensive for real-time performance until just a few years ago. One of the key operations in ray tracing is processing a visibility query for ray-scene intersections known as "ray traversal" which computes ray-scene intersections by traversing and intersecting nodes in a bounding volume hierarchy (BVH).

BRIEF DESCRIPTION OF THE DRAWINGS

A better understanding of the present invention can be obtained from the following detailed description in conjunction with the following drawings, in which:

FIG. 26 illustrates a sort key in accordance with one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures And Data Types

System Overview

Figure 1:
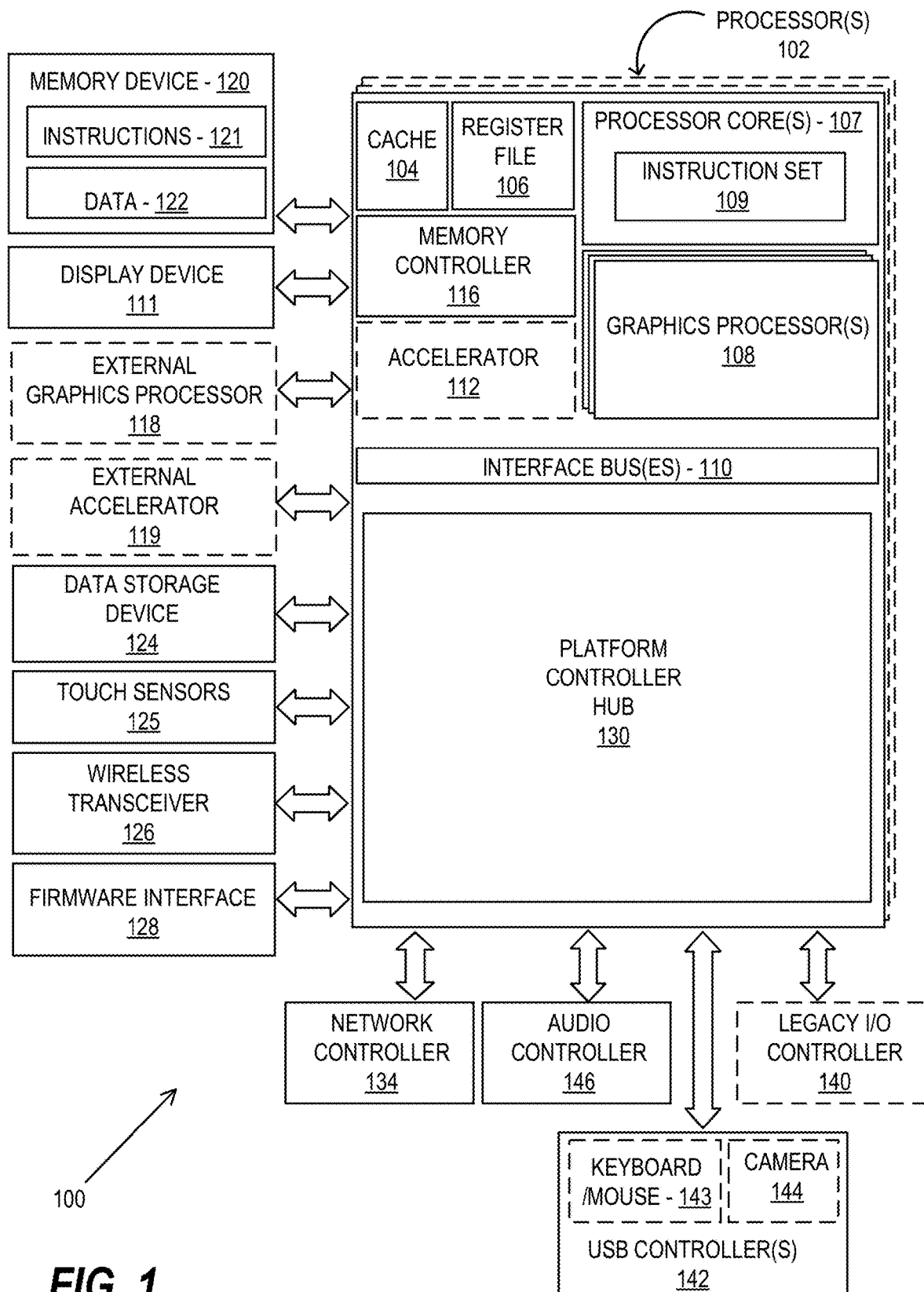
FIG. 1 is a block diagram of an embodiment of a computer system with a processor having one or more processor cores and graphics processors.

FIG. 1 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor (s) 102.

For example, circuit boards ("sleds") can be used on which components such as CPUs, memory, and other components are placed are designed for increased thermal performance In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 2A-2D illustrate computing systems and graphics processors provided by embodiments described herein. The elements of FIGS. 2A-2D having the same reference numbers (or names) as the elements of any other figure herein can operate or function in any manner similar to that described elsewhere herein, but are not limited to such.

Figure 2A:
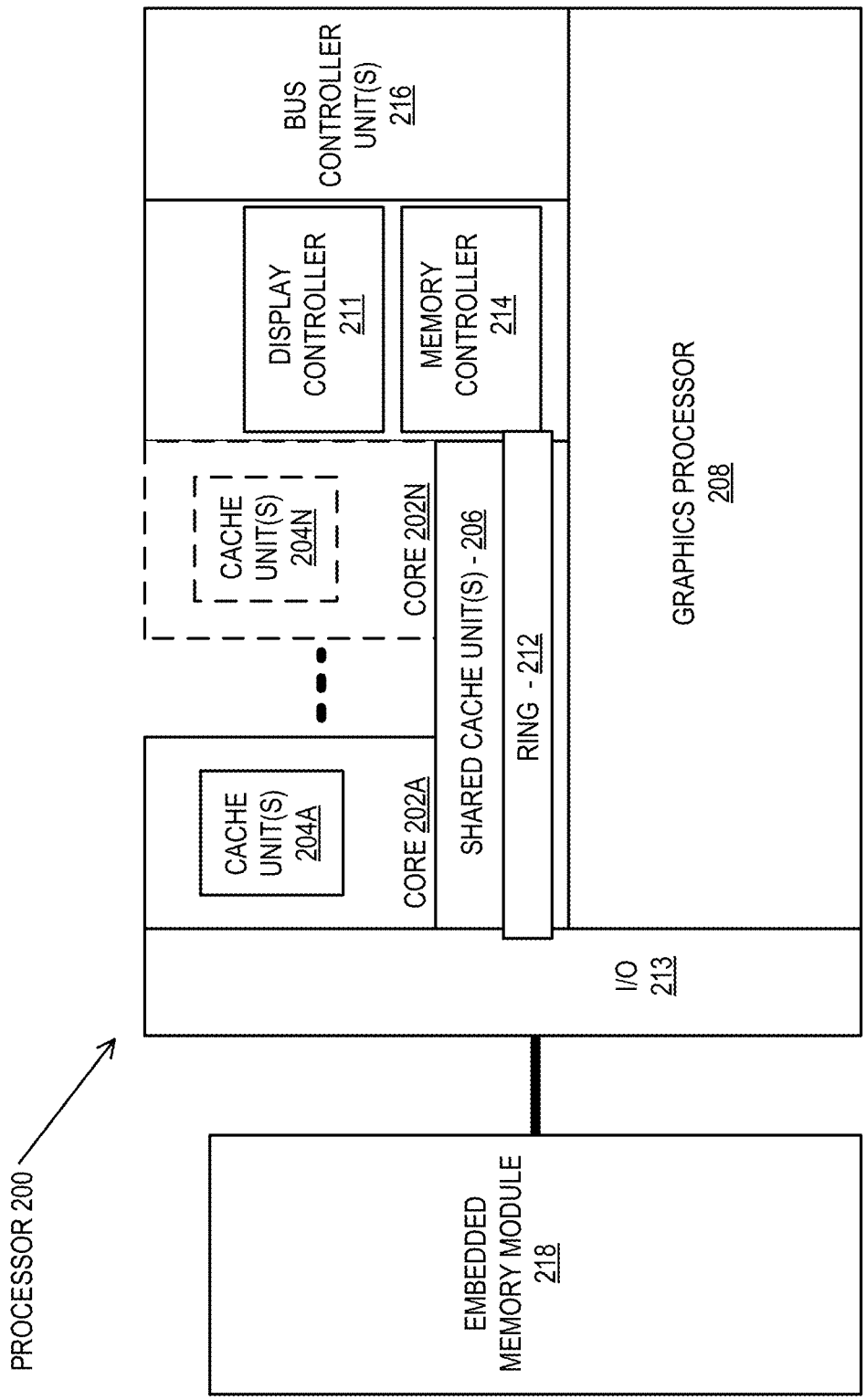
FIGS. 2A-D are a block diagrams of one embodiment of a processor having one or more processor cores, an integrated memory controller, and an integrated graphics processor.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
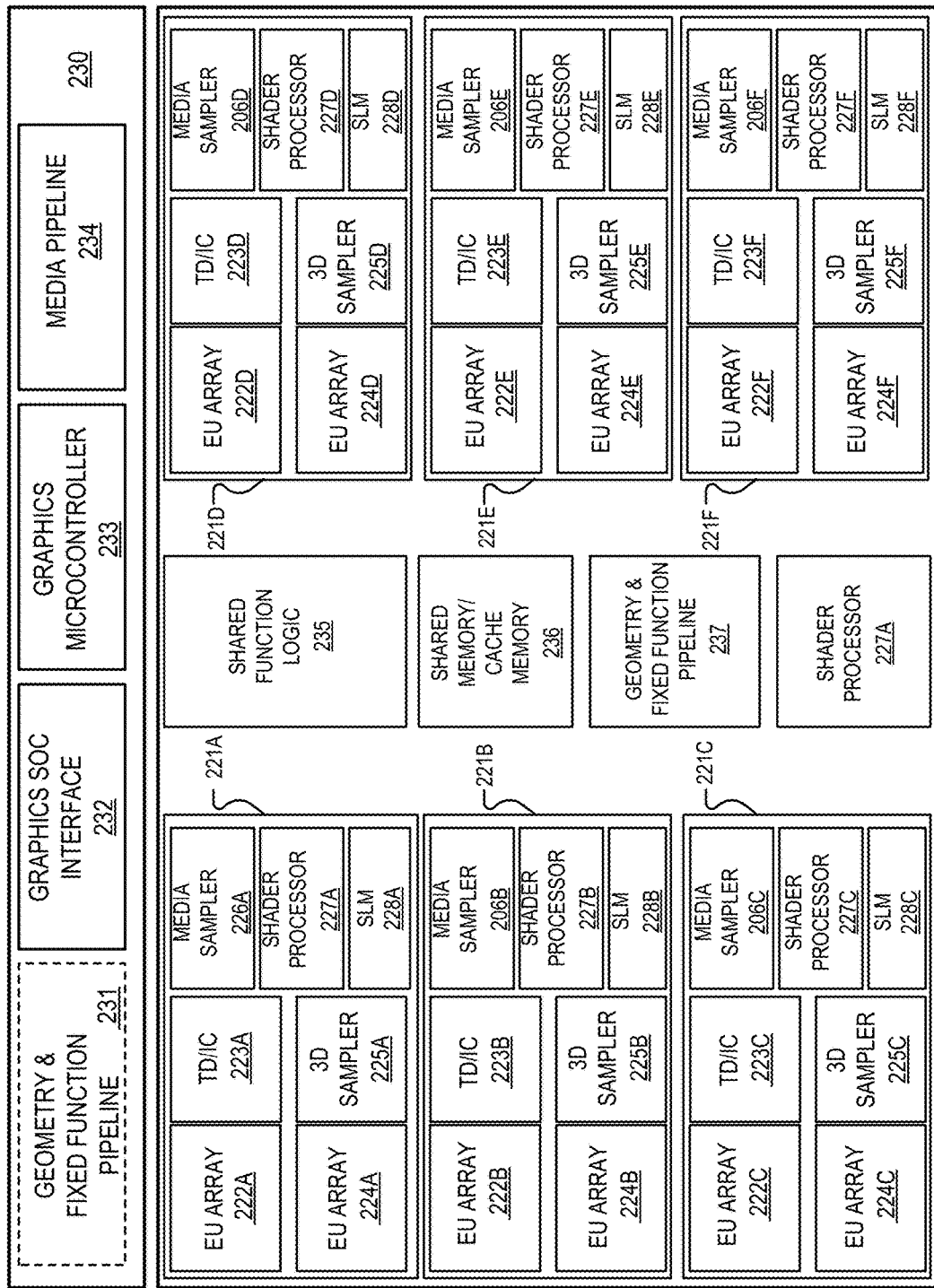

FIG. 2B is a block diagram of hardware logic of a graphics processor core 219, according to some embodiments described herein. Elements of FIG. 2B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is exemplary of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some embodiments, the fixed function block 230 includes a geometry/fixed function pipeline 231 that can be shared by all sub-cores in the graphics processor core 219, for example, in lower performance and/or lower power graphics processor implementations. In various embodiments, the geometry/fixed function pipeline 231 includes a 3D fixed function pipeline (e.g., 3D pipeline 312 as in FIG. 3 and FIG. 4, described below) a video front-end unit, a thread spawner and thread dispatcher, and a unified return buffer manager, which manages unified return buffers (e.g., unified return buffer 418 in FIG. 4, as described below).

In one embodiment the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and pre-emption. The media pipeline 234 (e.g., media pipeline 316 of FIG. 3 and FIG. 4) includes logic to facilitate the decoding, encoding, pre-processing, and/or post-processing of multimedia data, including image and video data. The media pipeline 234 implement media operations via requests to compute or sampling logic within the sub-cores 221-221F.

In one embodiment the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphic core 219 and other clock domains within the SoC. In one embodiment the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one embodiment the graphics microcontroller 233 can perform graphics and/or compute workload scheduling on the various graphics parallel engines within execution unit (EU) arrays 222A-222F, 224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 4 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one embodiment the graphics processor core 219 includes additional fixed function logic 238 that can include various fixed function acceleration logic for use by the graphics processor core 219. In one embodiment the additional fixed function logic 238 includes an additional geometry pipeline for use in position only shading. In position-only shading, two geometry pipelines exist, the full geometry pipeline within the geometry/fixed function pipeline 238, 231, and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 238 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 206A-206F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader programs. The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 206A-206F can perform similar read operations based on the type and format associated with media data. In one embodiment, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 2C:
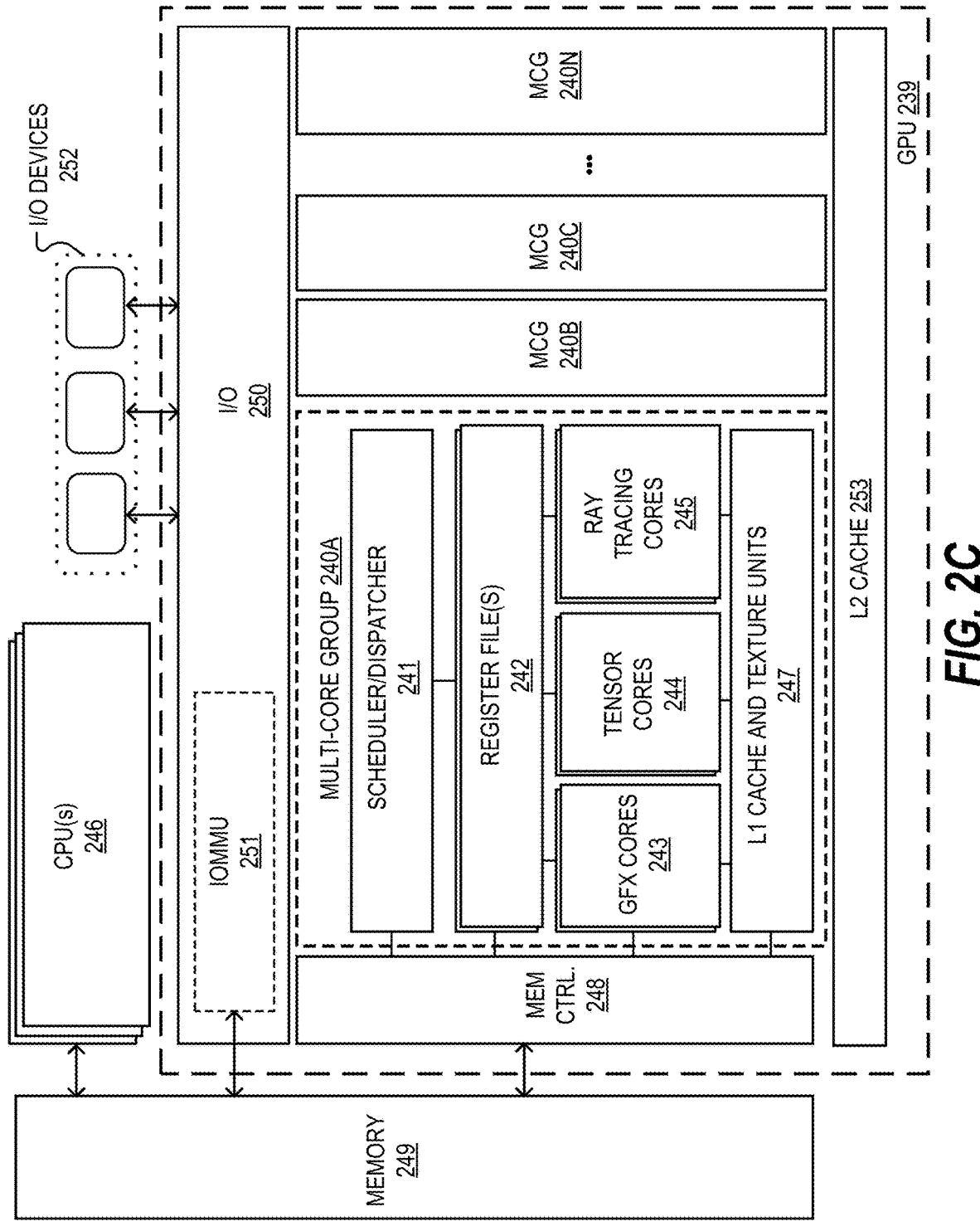

FIG. 2C illustrates a graphics processing unit (GPU) 239 that includes dedicated sets of graphics processing resources arranged into multi-core groups 240A-240N. While the details of only a single multi-core group 240A are provided, it will be appreciated that the other multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. A set of register files 242 store operand values used by the cores 243, 244, 245 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the system memory 249. In one embodiment, the IOMMU 251 manages multiple sets of page tables to map virtual addresses to physical addresses in system memory 249. In this embodiment, the I/O devices 252, CPU(s) 246, and GPU(s) 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPUs 239, and I/O devices 252 are integrated on a single semiconductor chip and/or chip package. The illustrated memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the invention are not limited to this specific implementation.

In one embodiment, the tensor cores 244 include a plurality of execution units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the invention are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 2D:
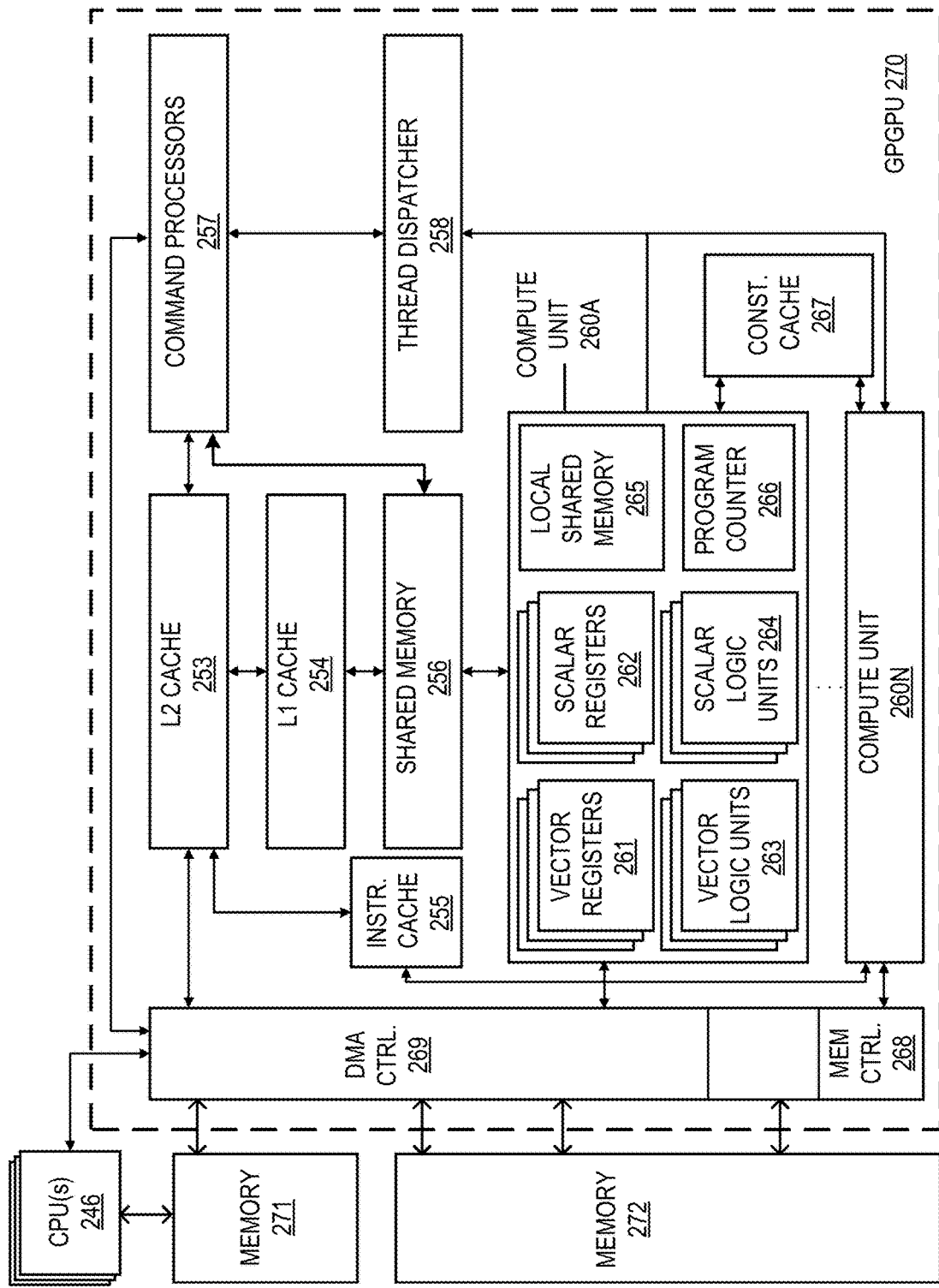

FIG. 2D is a block diagram of general purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and device memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands Each compute unit 260A-260N can execute threads independently of the other compute units. Additionally each compute unit 260A-260N can be independently configured for conditional computation and can conditionally output the results of computation to memory. The command processors 257 can interrupt the one or more CPU(s) 246 when the submitted commands are complete.

Figure 3A:
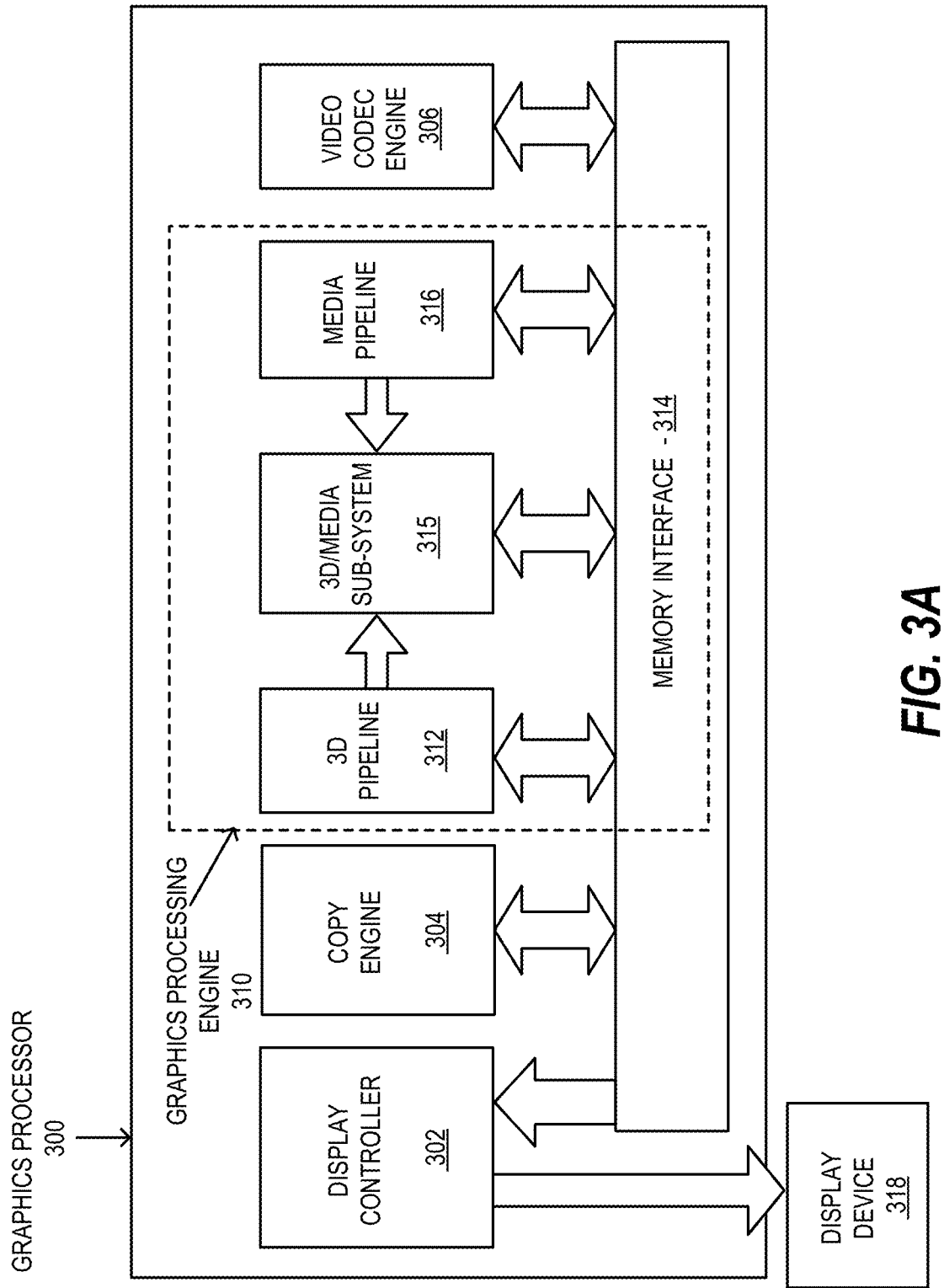
FIGS. 3A-C are a block diagrams of one embodiment of a graphics processor which may be a discreet graphics processing unit, or may be graphics processor integrated with a plurality of processing cores.
Figure 3B:
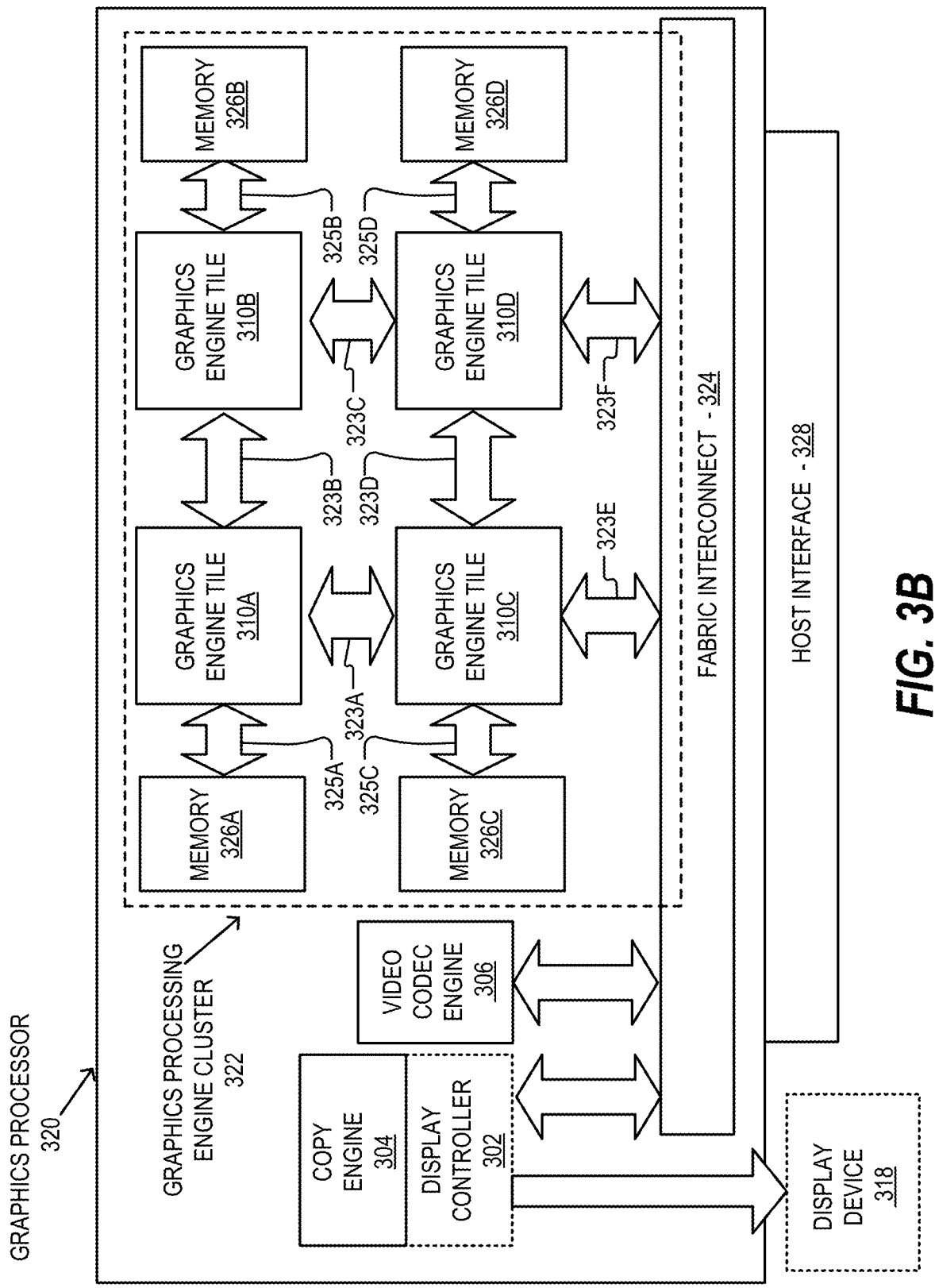
Figure 3C:
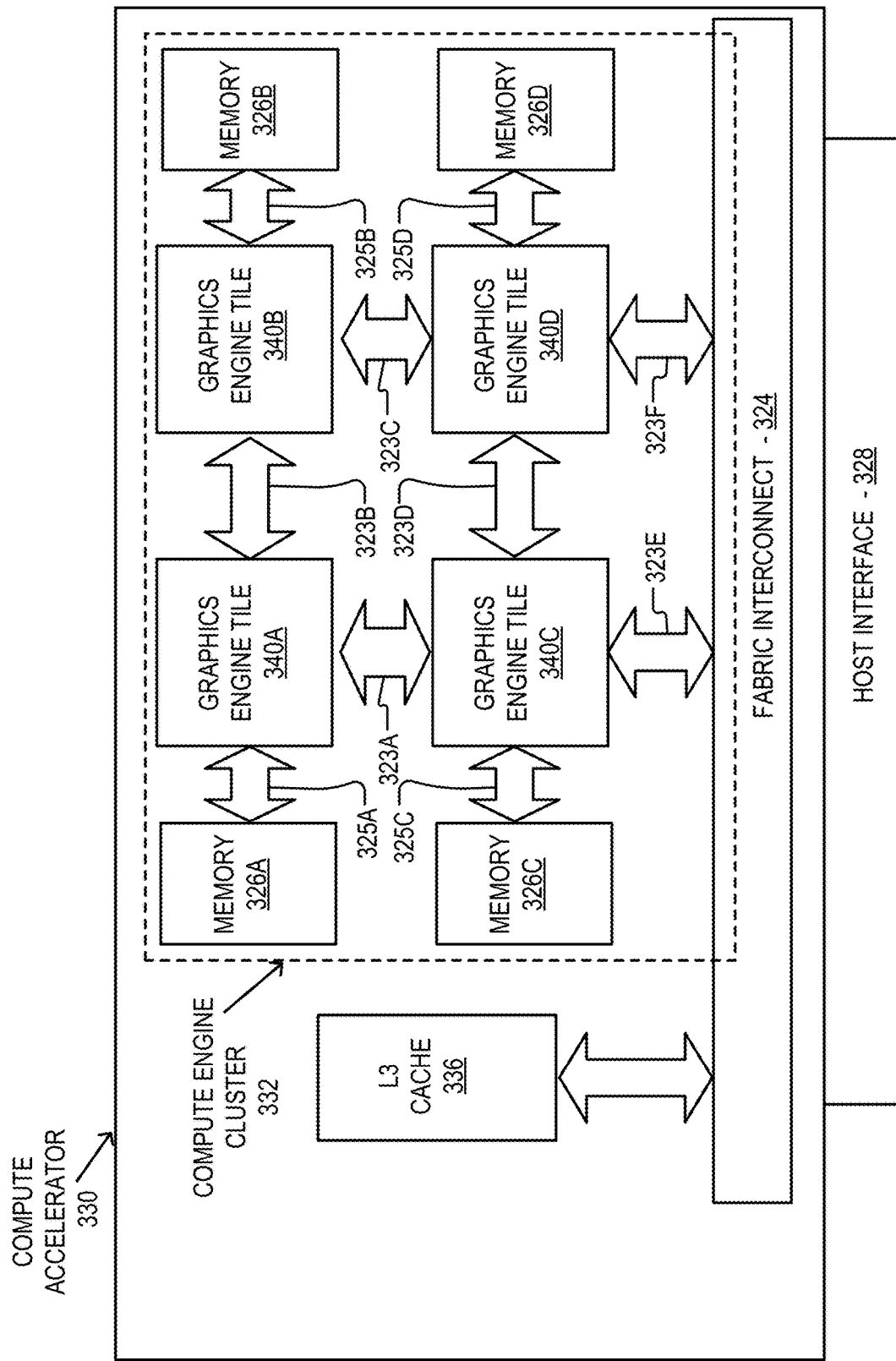

FIGS. 3A-3C illustrate block diagrams of additional graphics processor and compute accelerator architectures provided by embodiments described herein. The elements of FIGS. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are high-bandwidth memory (HBM) modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIGS. 11B-11D.

The graphics processing engine cluster 322 can connect with an on-chip or on-package fabric interconnect 324. The fabric interconnect 324 can enable communication between graphics engine tiles 310A-310D and components such as the video codec 306 and one or more copy engines 304. The copy engines 304 can be used to move data out of, into, and between the memory devices 326A-326D and memory that is external to the graphics processor 320 (e.g., system memory). The fabric interconnect 324 can also be used to interconnect the graphics engine tiles 310A-310D. The graphics processor 320 may optionally include a display controller 302 to enable a connection with an external display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

Graphics Processing Engine

Figure 4:
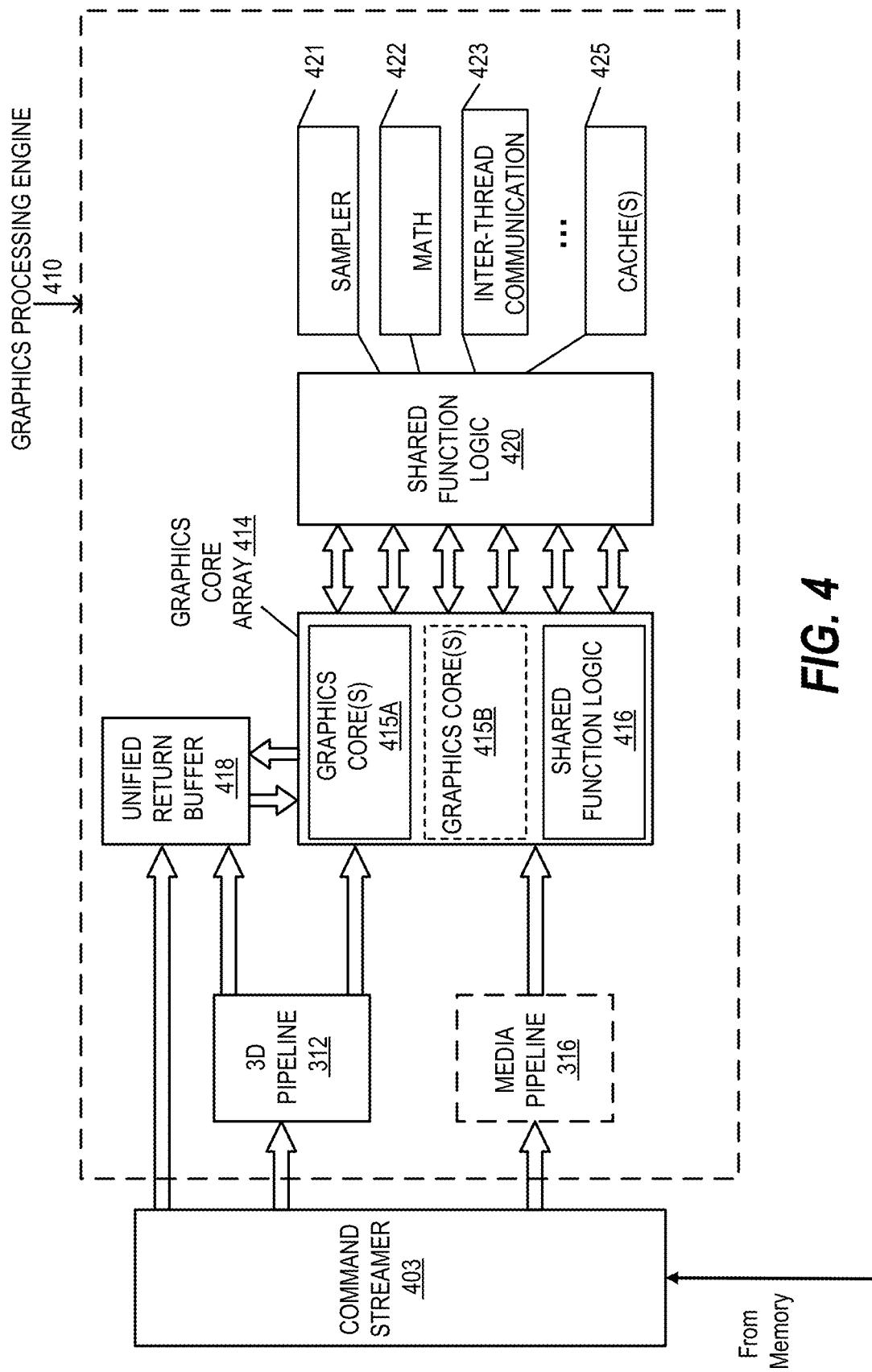
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3A, and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Execution Units

Figure 5A:
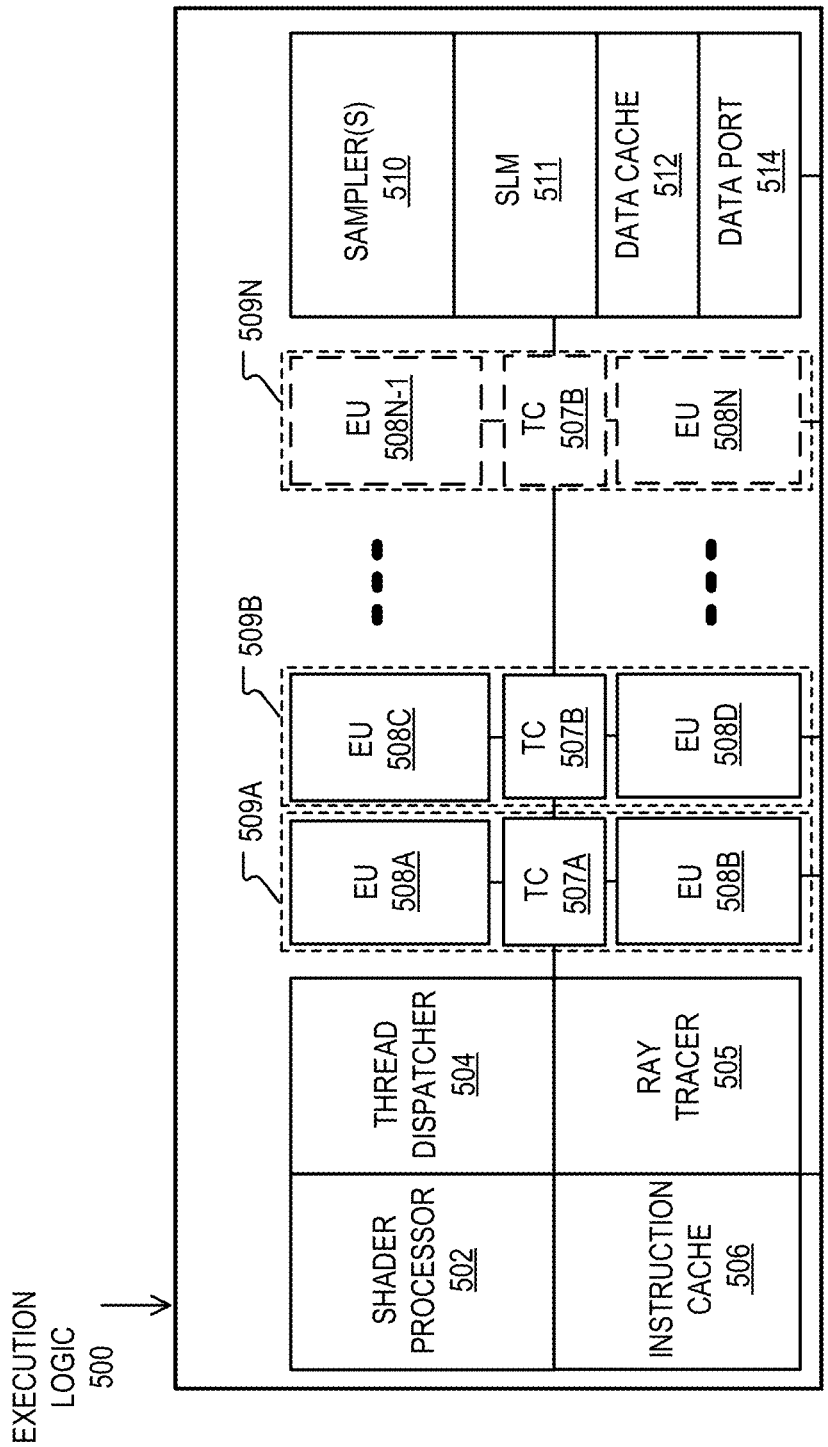
FIGS. 5A-B are a block diagrams of another embodiment of a graphics processor.
Figure 5B:
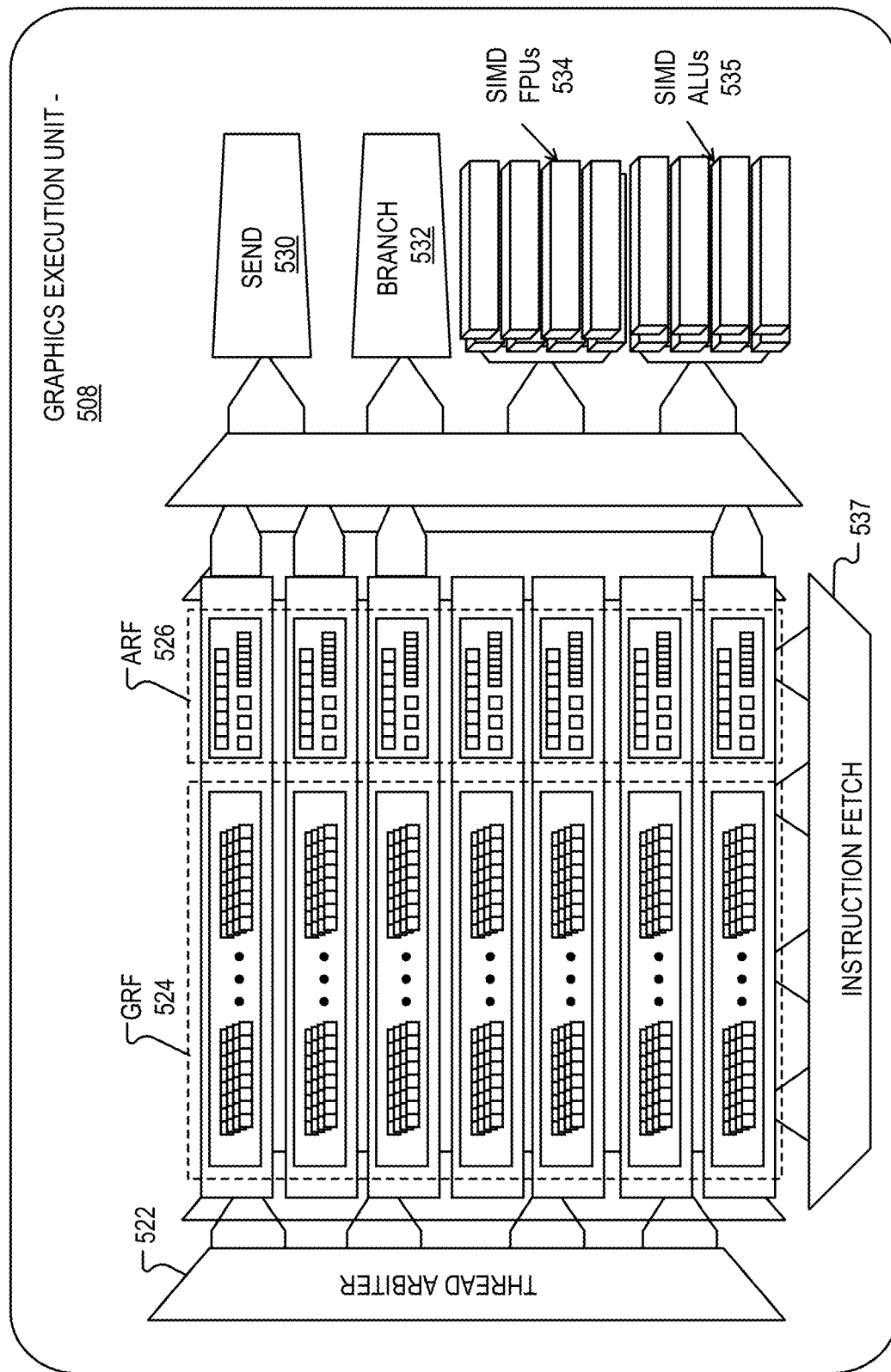

FIGS. 5A-5B illustrate thread execution logic 500 including an array of processing elements employed in a graphics processor core according to embodiments described herein. Elements of FIGS. 5A-5B having the same reference numbers (or names) as the elements of any other figure herein can operate or function in any manner similar to that described elsewhere herein, but are not limited to such. FIG. 5A-5B illustrates an overview of thread execution logic 500, which may be representative of hardware logic illustrated with each sub-core 221A-221F of FIG. 2B. FIG. 5A is representative of an execution unit within a general-purpose graphics processor, while FIG. 5B is representative of an execution unit that may be used within a compute accelerator.

As illustrated in FIG. 5A, in some embodiments thread execution logic 500 includes a shader processor 502, a thread dispatcher 504, instruction cache 506, a scalable execution unit array including a plurality of execution units 508A-508N, a sampler 510, shared local memory 511, a data cache 512, and a data port 514. In one embodiment the scalable execution unit array can dynamically scale by enabling or disabling one or more execution units (e.g., any of execution units 508A, 508B, 508C, 508D, through 508N-1 and 508N) based on the computational requirements of a workload. In one embodiment the included components are interconnected via an interconnect fabric that links to each of the components. In some embodiments, thread execution logic 500 includes one or more connections to memory, such as system memory or cache memory, through one or more of instruction cache 506, data port 514, sampler 510, and execution units 508A-508N. In some embodiments, each execution unit (e.g. 508A) is a stand-alone programmable general-purpose computational unit that is capable of executing multiple simultaneous hardware threads while processing multiple data elements in parallel for each thread. In various embodiments, the array of execution units 508A-508N is scalable to include any number individual execution units.

In some embodiments, the execution units 508A-508N are primarily used to execute shader programs. A shader processor 502 can process the various shader programs and dispatch execution threads associated with the shader programs via a thread dispatcher 504. In one embodiment the thread dispatcher includes logic to arbitrate thread initiation requests from the graphics and media pipelines and instantiate the requested threads on one or more execution unit in the execution units 508A-508N. For example, a geometry pipeline can dispatch vertex, tessellation, or geometry shaders to the thread execution logic for processing. In some embodiments, thread dispatcher 504 can also process runtime thread spawning requests from the executing shader programs.

In some embodiments, the execution units 508A-508N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some embodiments, one or more data caches (e.g., 512) are included to cache thread data during thread execution. Threads executing on the execution logic 500 can also store explicitly managed data in the shared local memory 511. In some embodiments, a sampler 510 is included to provide texture sampling for 3D operations and media sampling for media operations. In some embodiments, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some embodiments, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some embodiments, the data port 514 provides a memory access mechanism for the thread execution logic 500 to output processed data to memory for further processing on a graphics processor output pipeline. In some embodiments, the data port 514 includes or couples to one or more cache memories (e.g., data cache 512) to cache data for memory access via the data port.

In one embodiment, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 2C.

FIG. 5B illustrates exemplary internal details of an execution unit 508, according to embodiments. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of dedicated integer SIMD ALUs 535. The GRF 524 and ARF 526 includes the set of general register files and architecture register files associated with each simultaneous hardware thread that may be active in the graphics execution unit 508. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one embodiment, the graphics execution unit 508 can co-issue multiple instructions, which may each be different instructions. The thread arbiter 522 of the graphics execution unit thread 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one embodiment, each execution unit thread has access to 4 Kbytes within the GRF 524, although embodiments are not so limited, and greater or fewer register resources may be provided in other embodiments. In one embodiment the graphics execution unit 508 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the graphics execution unit 508 includes one or more SIMD floating point units (FPU(s)) 534 to perform floating-point operations. In one embodiment, the FPU(s) 534 also support integer computation. In one embodiment the FPU(s) 534 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 535 are also present, and may be specifically optimized to perform operations associated with machine learning computations.

In one embodiment, arrays of multiple instances of the graphics execution unit 508 can be instantiated in a graphics sub-core grouping (e.g., a sub-slice). For scalability, product architects can choose the exact number of execution units per sub-core grouping. In one embodiment the execution unit 508 can execute instructions across a plurality of execution channels. In a further embodiment, each thread executed on the graphics execution unit 508 is executed on a different channel.

Figure 6:
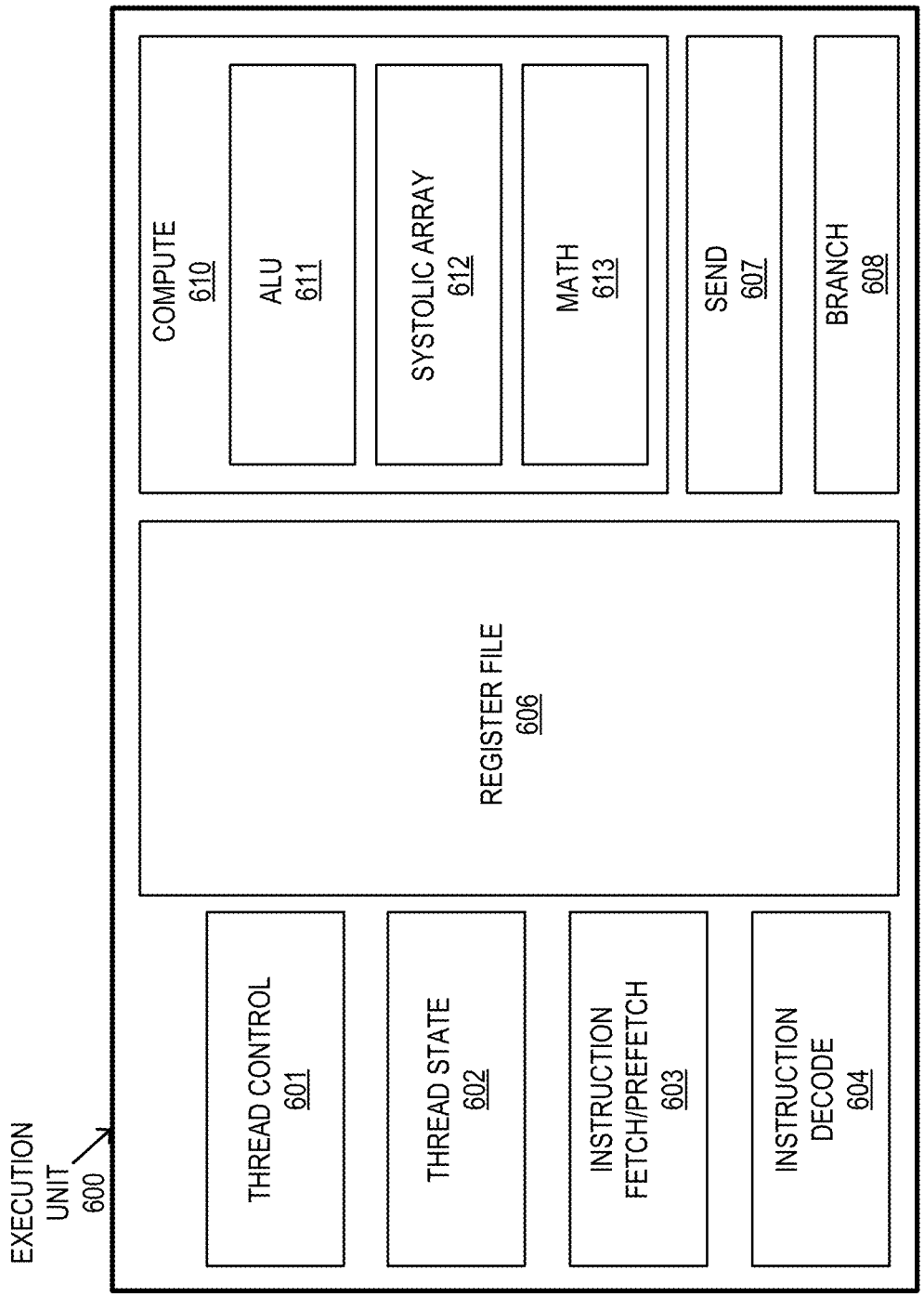
FIG. 6 illustrates examples of execution circuitry and logic.

FIG. 6 illustrates an additional execution unit 600, according to an embodiment. The execution unit 600 may be a compute-optimized execution unit for use in, for example, a compute engine tile 340A-340D as in FIG. 3C, but is not limited as such. Variants of the execution unit 600 may also be used in a graphics engine tile 310A-310D as in FIG. 3B. In one embodiment, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one embodiment, the send unit 607 and branch unit 608 can operate similarly as the send unit 530 and a branch unit 532 of the graphics execution unit 508 of FIG. 5B.

The execution unit 600 also includes a compute unit 610 that includes multiple different types of functional units. In one embodiment the compute unit 610 includes an ALU unit 611 that includes an array of arithmetic logic units. The ALU unit 611 can be configured to perform 64-bit, 32-bit, and 16-bit integer and floating point operations. Integer and floating point operations may be performed simultaneously. The compute unit 610 can also include a systolic array 612, and a math unit 613. The systolic array 612 includes a W wide and D deep network of data processing units that can be used to perform vector or other data-parallel operations in a systolic manner In one embodiment the systolic array 612 can be configured to perform matrix operations, such as matrix dot product operations. In one embodiment the systolic array 612 support 16-bit floating point operations, as well as 8-bit and 4-bit integer operations. In one embodiment the systolic array 612 can be configured to accelerate machine learning operations. In such embodiments, the systolic array 612 can be configured with support for the bfloat 16-bit floating point format. In one embodiment, a math unit 613 can be included to perform a specific subset of mathematical operations in an efficient and lower-power manner than then ALU unit 611. The math unit 613 can include a variant of math logic that may be found in shared function logic of a graphics processing engine provided by other embodiments (e.g., math logic 422 of the shared function logic 420 of FIG. 4). In one embodiment the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher level execution logic (e.g., instruction cache 506 as in FIG. 5A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one embodiment, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across embodiments based on the number of supported hardware threads. In one embodiment, register renaming may be used to dynamically allocate registers to hardware threads.

Figure 7:
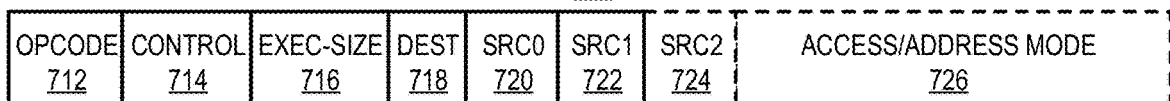
FIG. 7 illustrates a graphics processor execution unit instruction format according to an embodiment.
Figure 7:
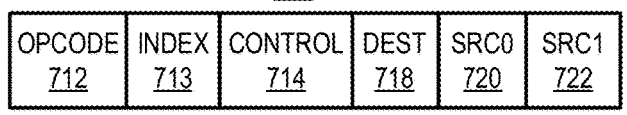
Figure 7:
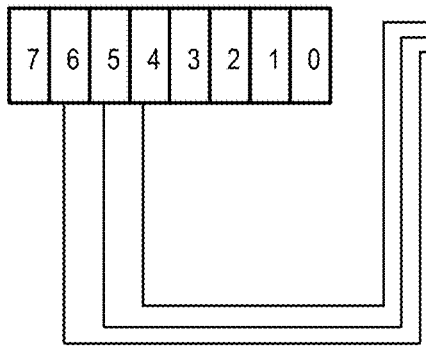

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
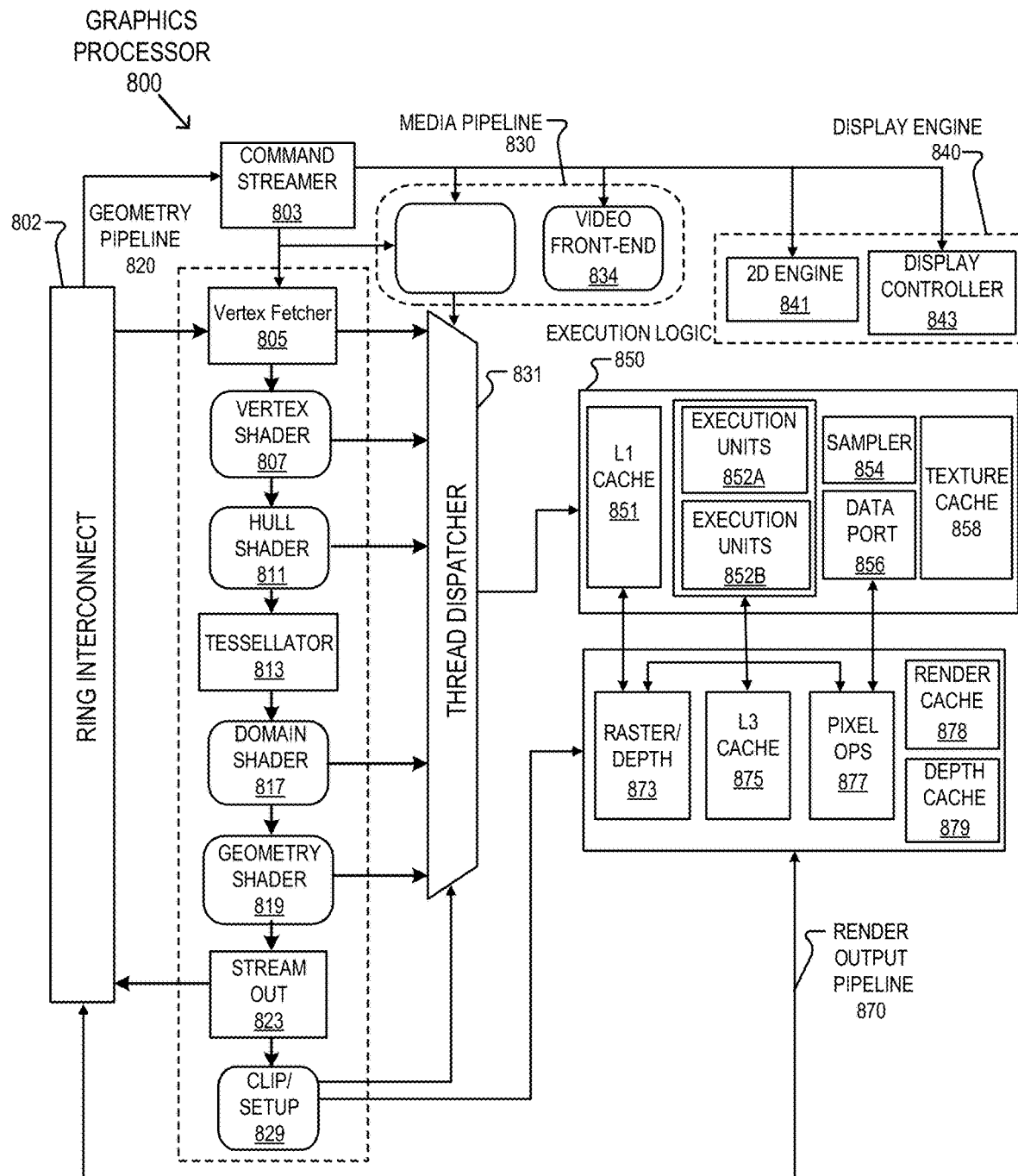
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
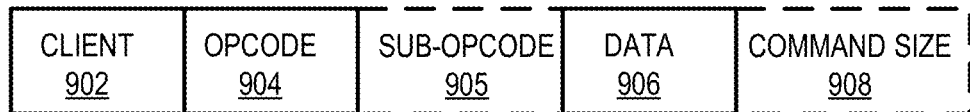
FIG. 9A is a block diagram illustrating a graphics processor command format according to an embodiment.
Figure 9B:
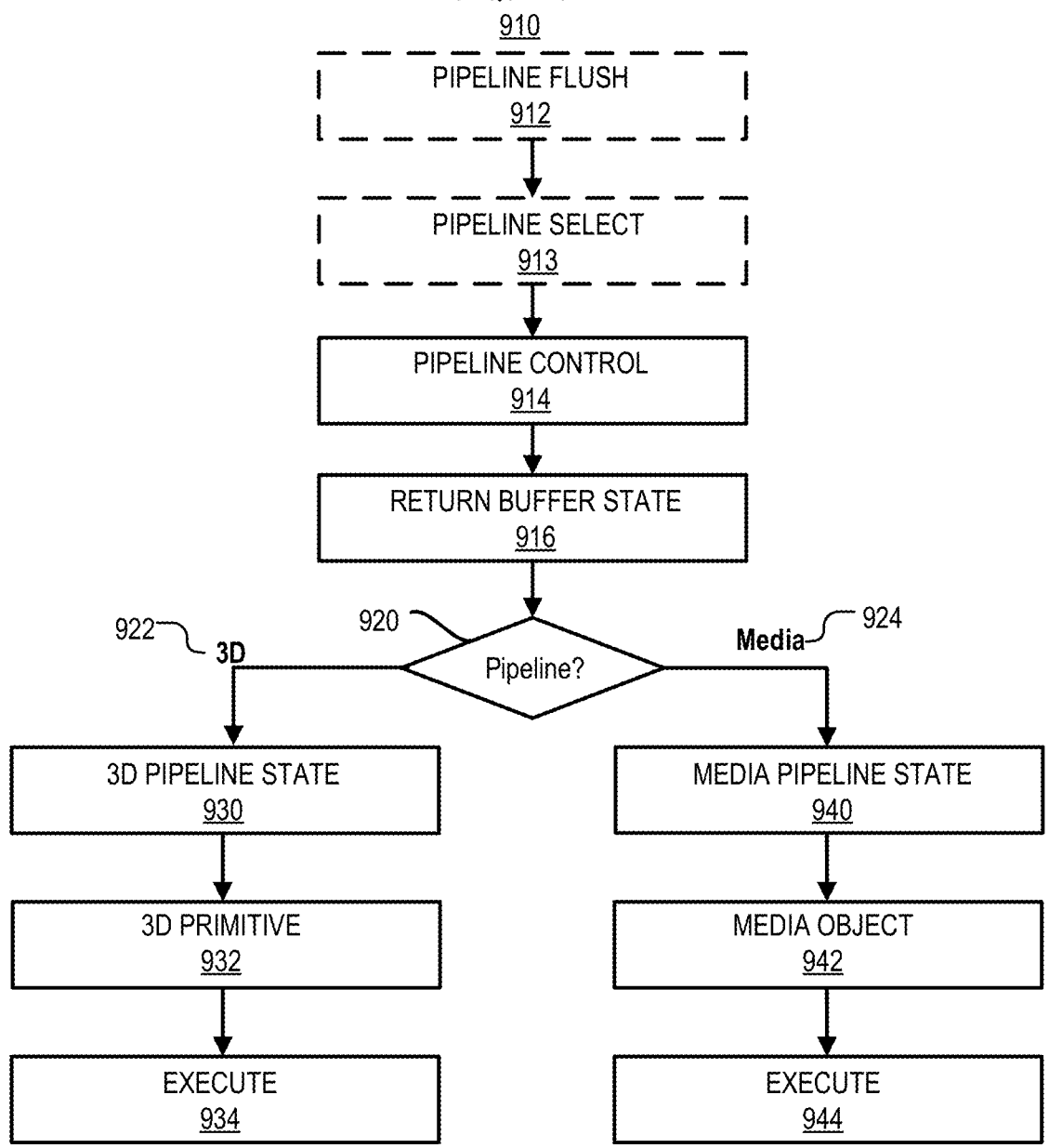
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands Once the command is received by the client unit, the client unit reads the opcode 904 and, if present, sub-opcode 905 to determine the operation to perform. The client unit performs the command using information in data field 906. For some commands an explicit command size 908 is expected to specify the size of the command In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
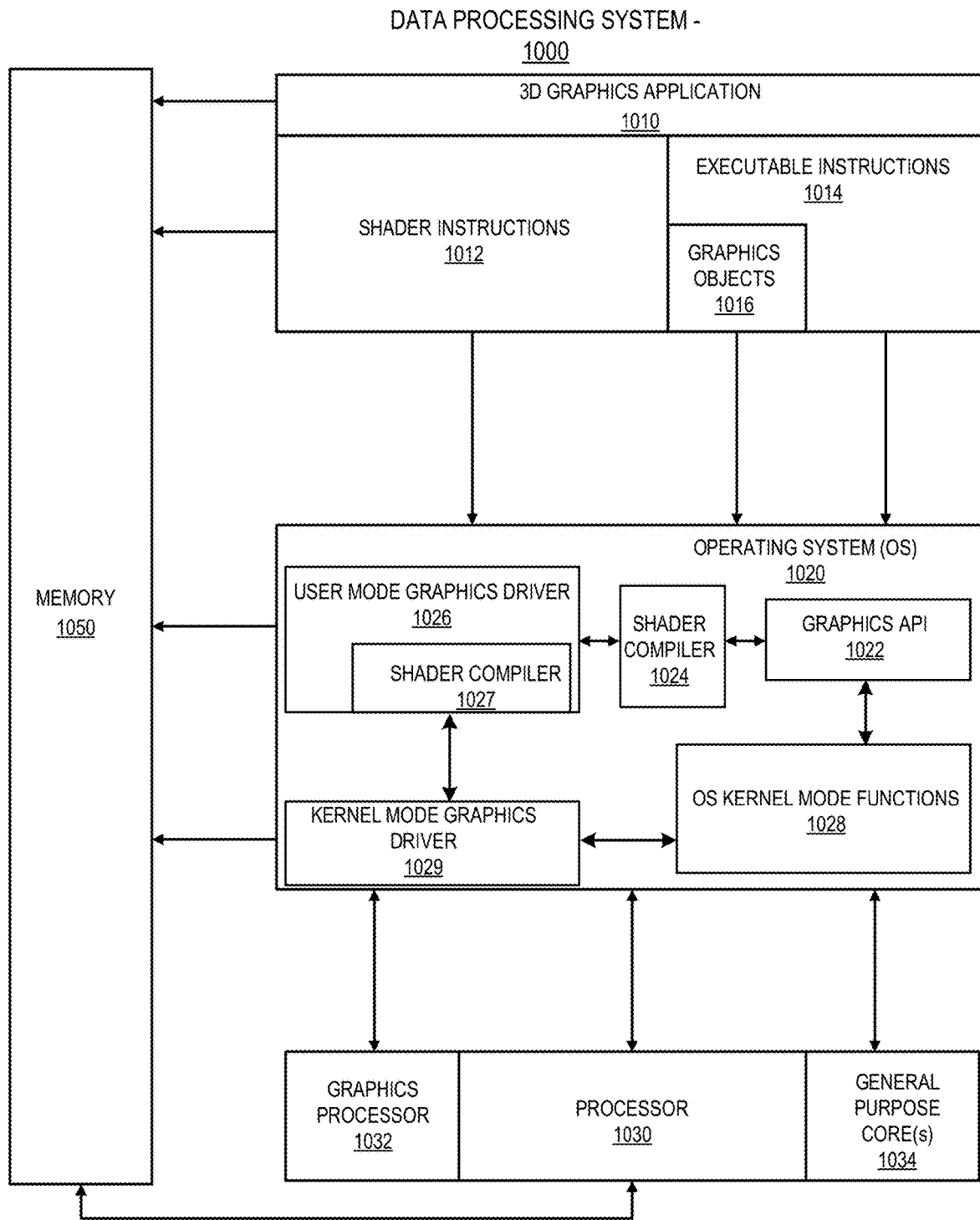
FIG. 10 illustrates exemplary graphics software architecture for a data processing system according to an embodiment.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
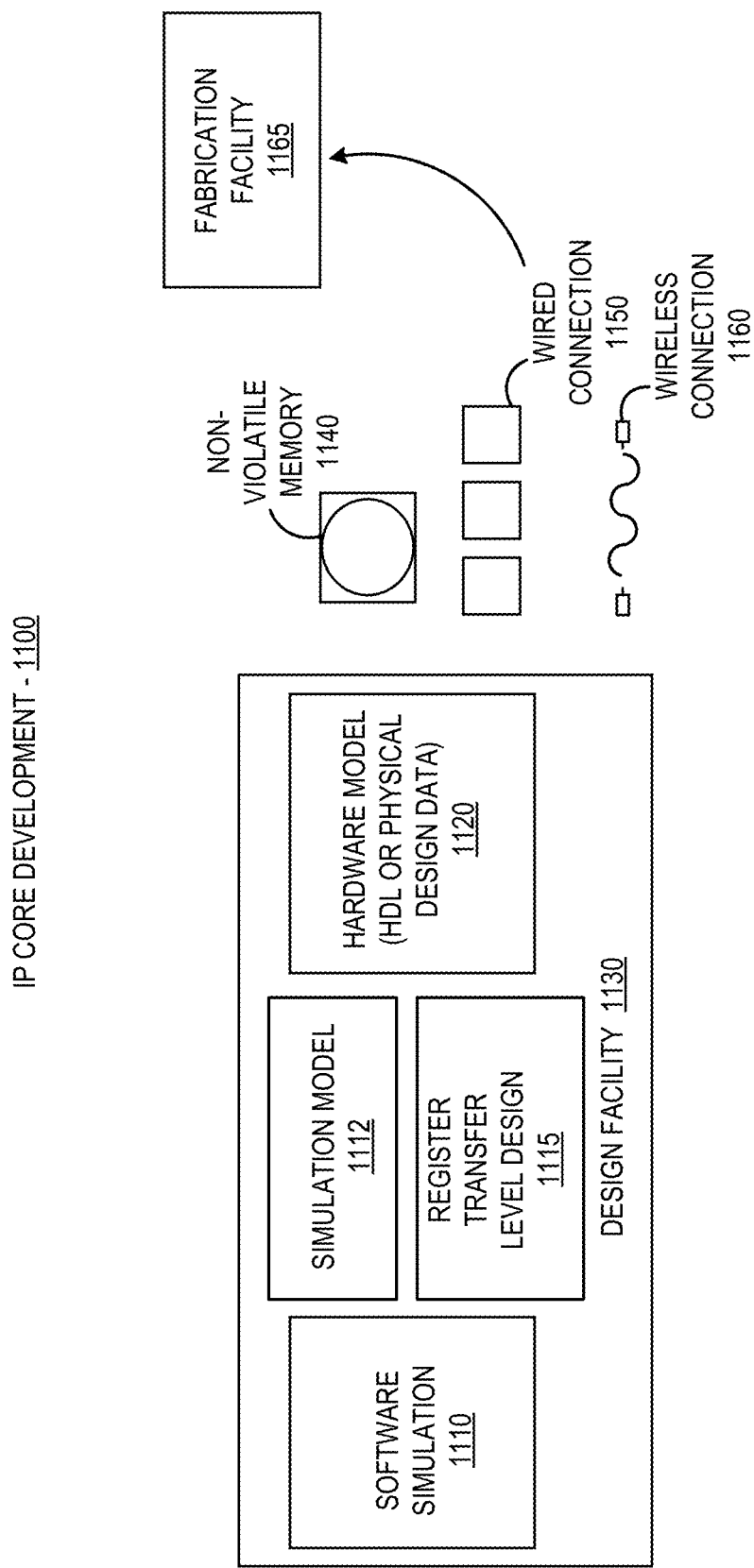
FIGS. 11A-D illustrates an exemplary IP core development system that may be used to manufacture an integrated circuit and an exemplary package assembly.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
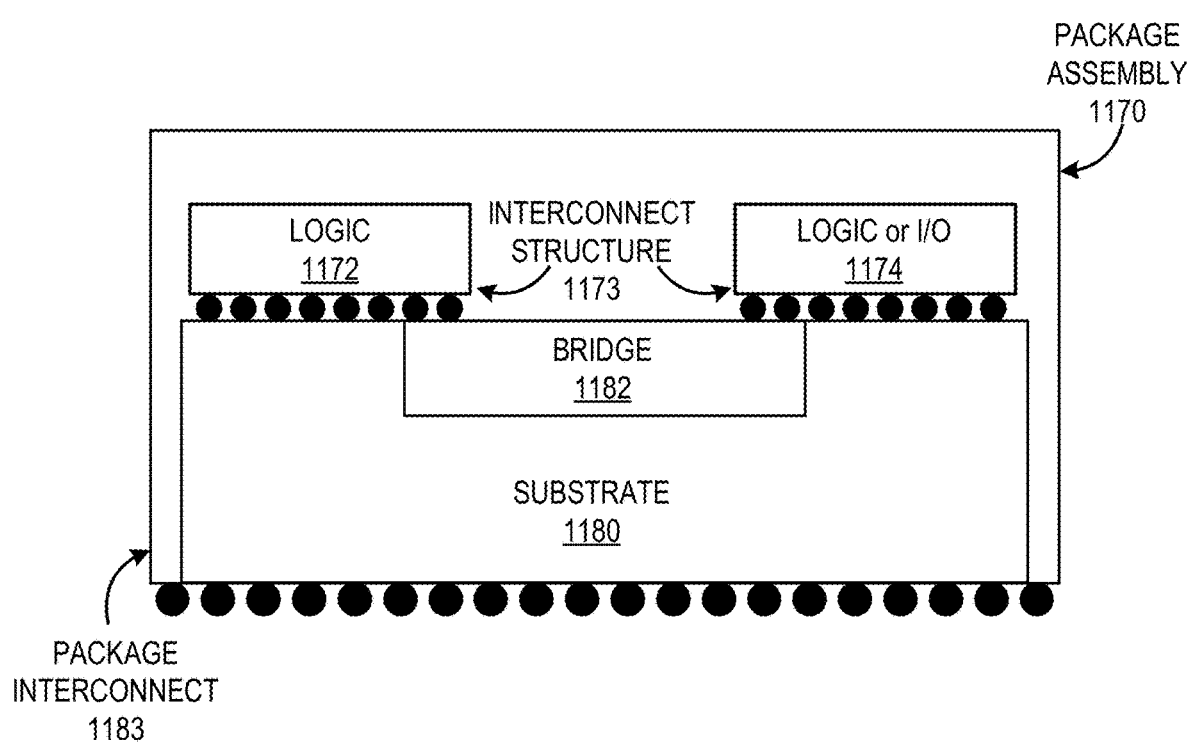

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 11C:
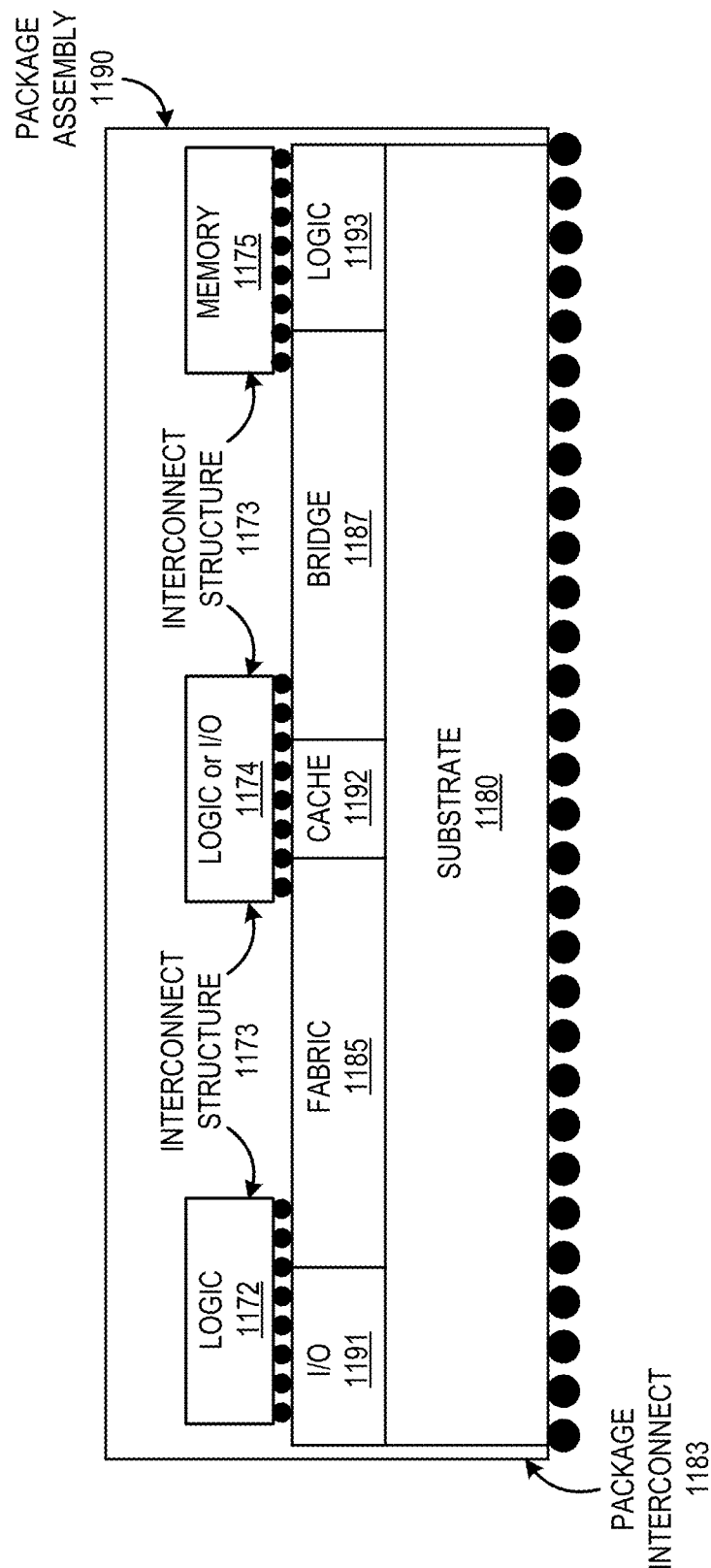

FIG. 11C illustrates a package assembly 1190 that includes multiple units of hardware logic chiplets connected to a substrate 1180 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory.

Each chiplet can be fabricated as separate semiconductor die and coupled with the substrate 1180 via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O and memory chiplets.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

The substrate 1180 can include hardware components for I/O 1191, cache memory 1192, and other hardware logic 1193. A fabric 1185 can be embedded in the substrate 1180 to enable communication between the various logic chiplets and the logic 1191, 1193 within the substrate 1180. In one embodiment, the I/O 1191, fabric 1185, cache, bridge, and other hardware logic 1193 can be integrated into a base die that is layered on top of the substrate 1180.

In various embodiments a package assembly 1190 can include fewer or greater number of components and chiplets that are interconnected by a fabric 1185 or one or more bridges 1187. The chiplets within the package assembly 1190 may be arranged in a 3D or 2.5D arrangement. In general, bridge structures 1187 may be used to facilitate a point to point interconnect between, for example, logic or I/O chiplets and memory chiplets. The fabric 1185 can be used to interconnect the various logic and/or I/O chiplets (e.g., chiplets 1172, 1174, 1191, 1193). with other logic and/or I/O chiplets. In one embodiment, the cache memory 1192 within the substrate can act as a global cache for the package assembly 1190, part of a distributed global cache, or as a dedicated cache for the fabric 1185.

Figure 11D:
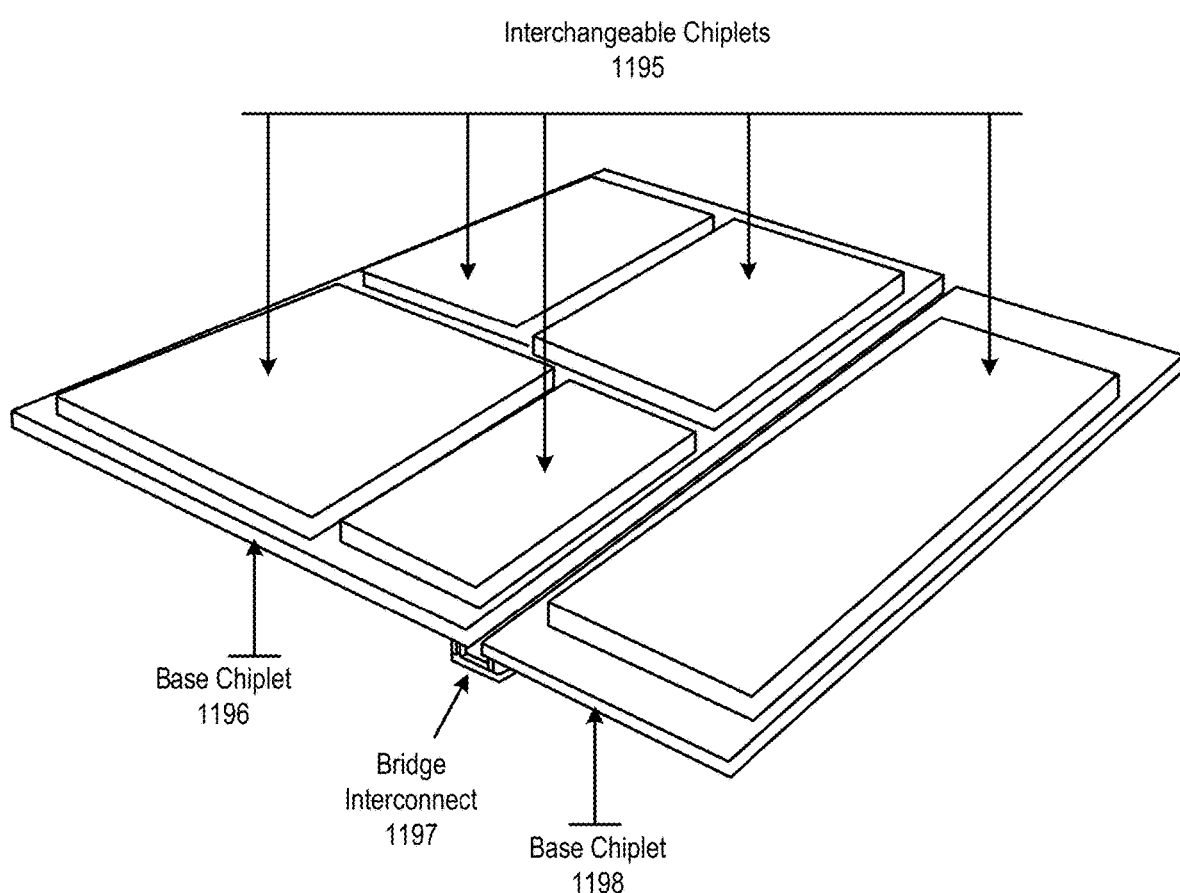

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
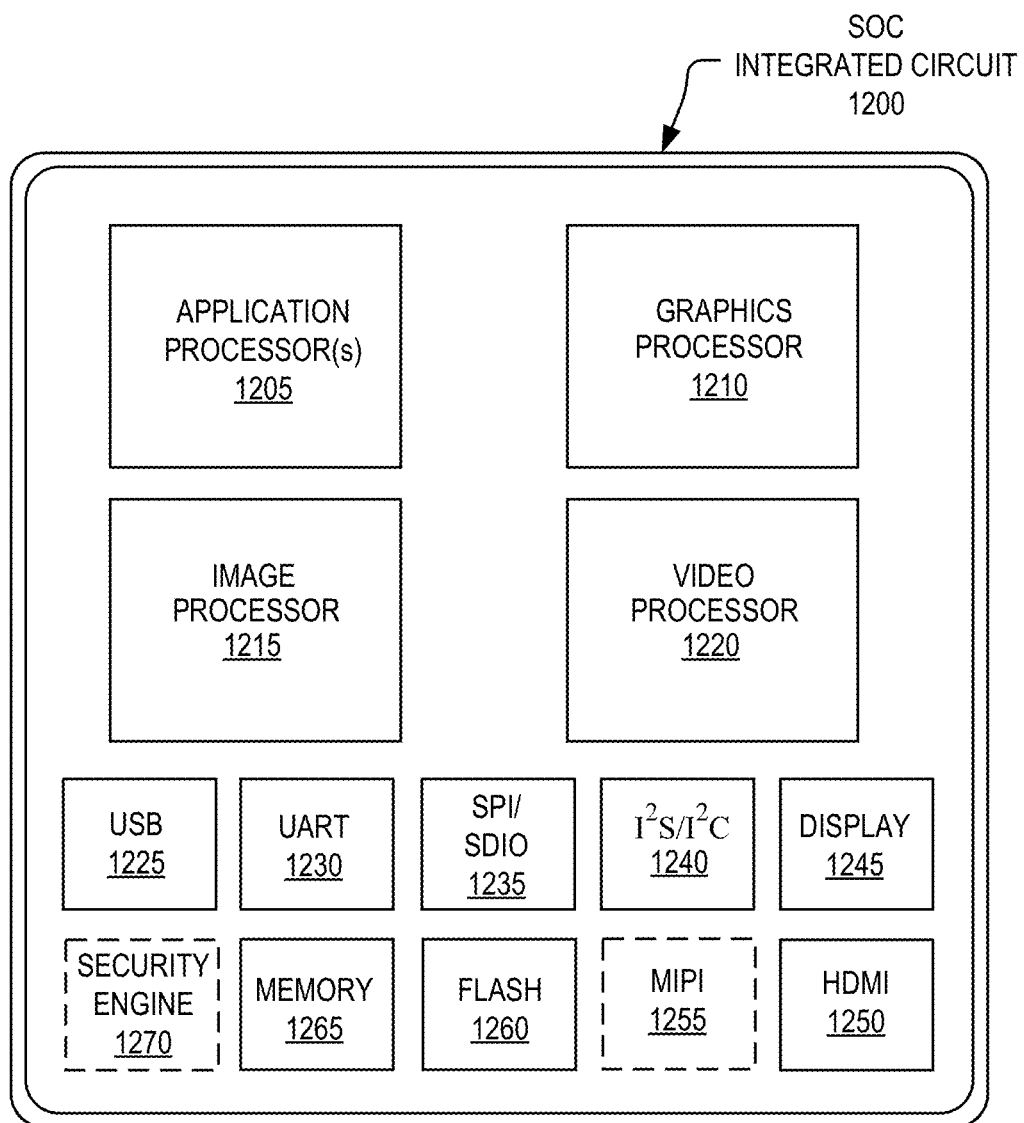
FIG. 12 illustrates an exemplary system on a chip integrated circuit that may be fabricated using one or more IP cores, according to an embodiment.
Figure 13:
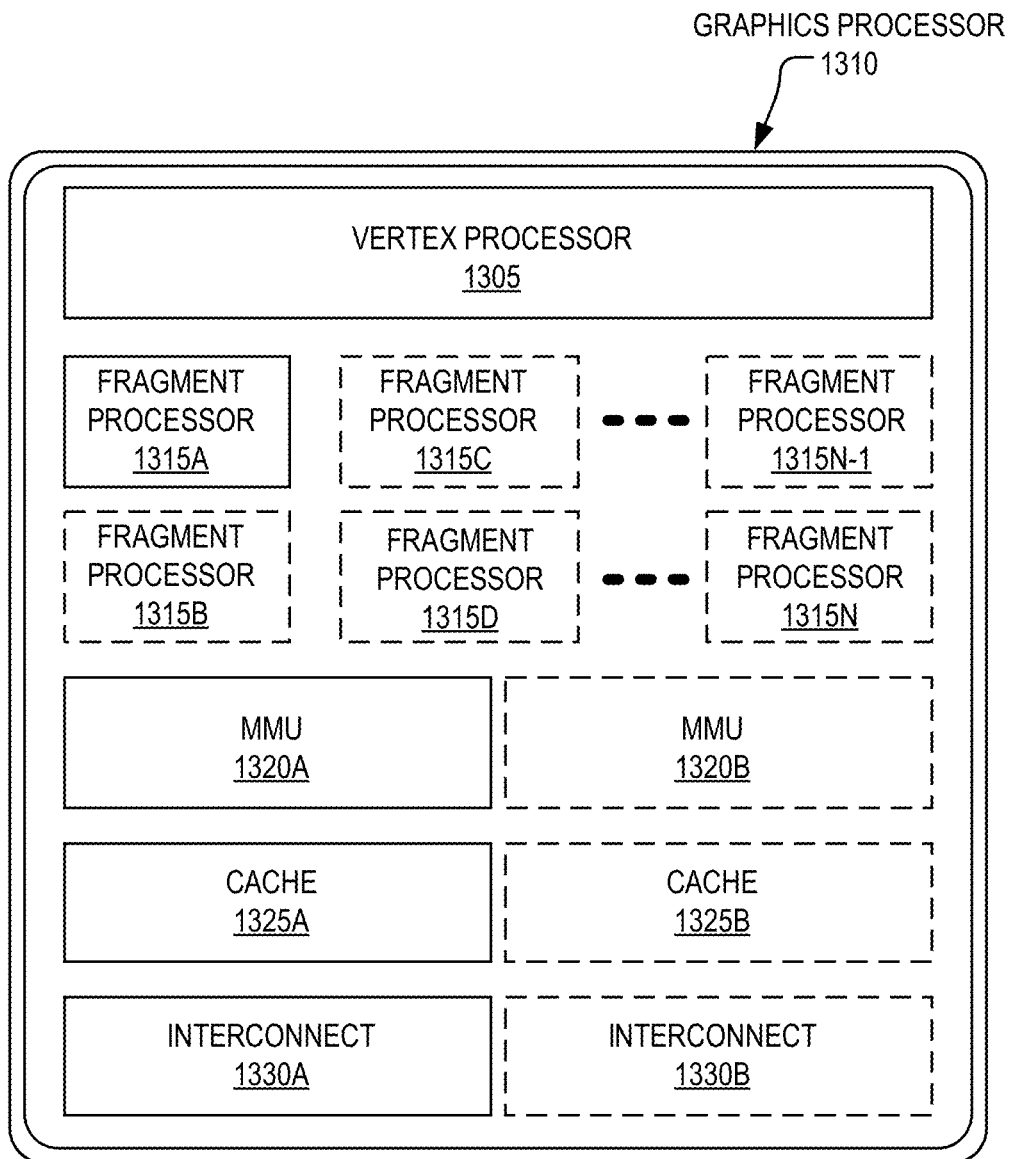
FIG. 13 illustrates an exemplary graphics processor of a system on a chip integrated circuit that may be fabricated using one or more IP cores.

FIGS. 12-13 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 14:
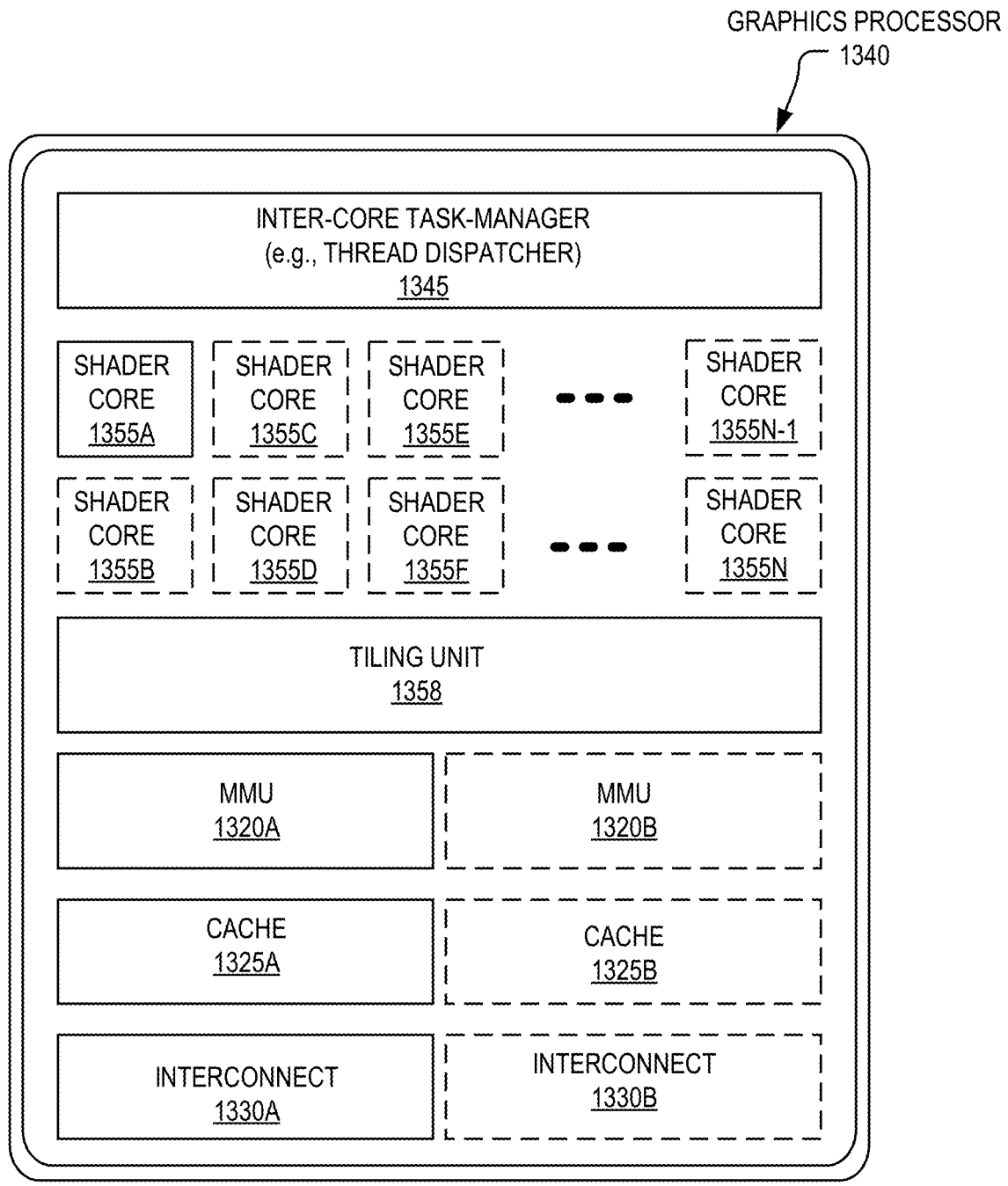
FIG. 14 illustrate exemplary graphics processor architectures.

FIGS. 13-14 are block diagrams illustrating exemplary graphics processors for use within an SoC, according to embodiments described herein. FIG. 13 illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13 is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 14, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

As indicated above, to quantize the vertex component to NV-bit signed space, each vertex component's exponent is subtracted from the global exponent for that axis. The component value is then shifted down by this difference. This may of course discard some precision in the lower portion of the component. To capture this loss, an AABB is produced by rounding the min value down and the max value up after this shift. To maintain simplicity, a vertex is quantized to a unit AABB, even if there is no error during quantization.

Ray Tracing Architecture

In one implementation, the graphics processor includes circuitry and/or program code for performing real-time ray tracing. In some embodiments, a dedicated set of ray tracing cores are included in the graphics processor to perform the various ray tracing operations described herein, including ray traversal and/or ray intersection operations. In addition to the ray tracing cores, one embodiment includes multiple sets of graphics processing cores for performing programmable shading operations and multiple sets of tensor cores for performing matrix operations on tensor data.

Figure 15:
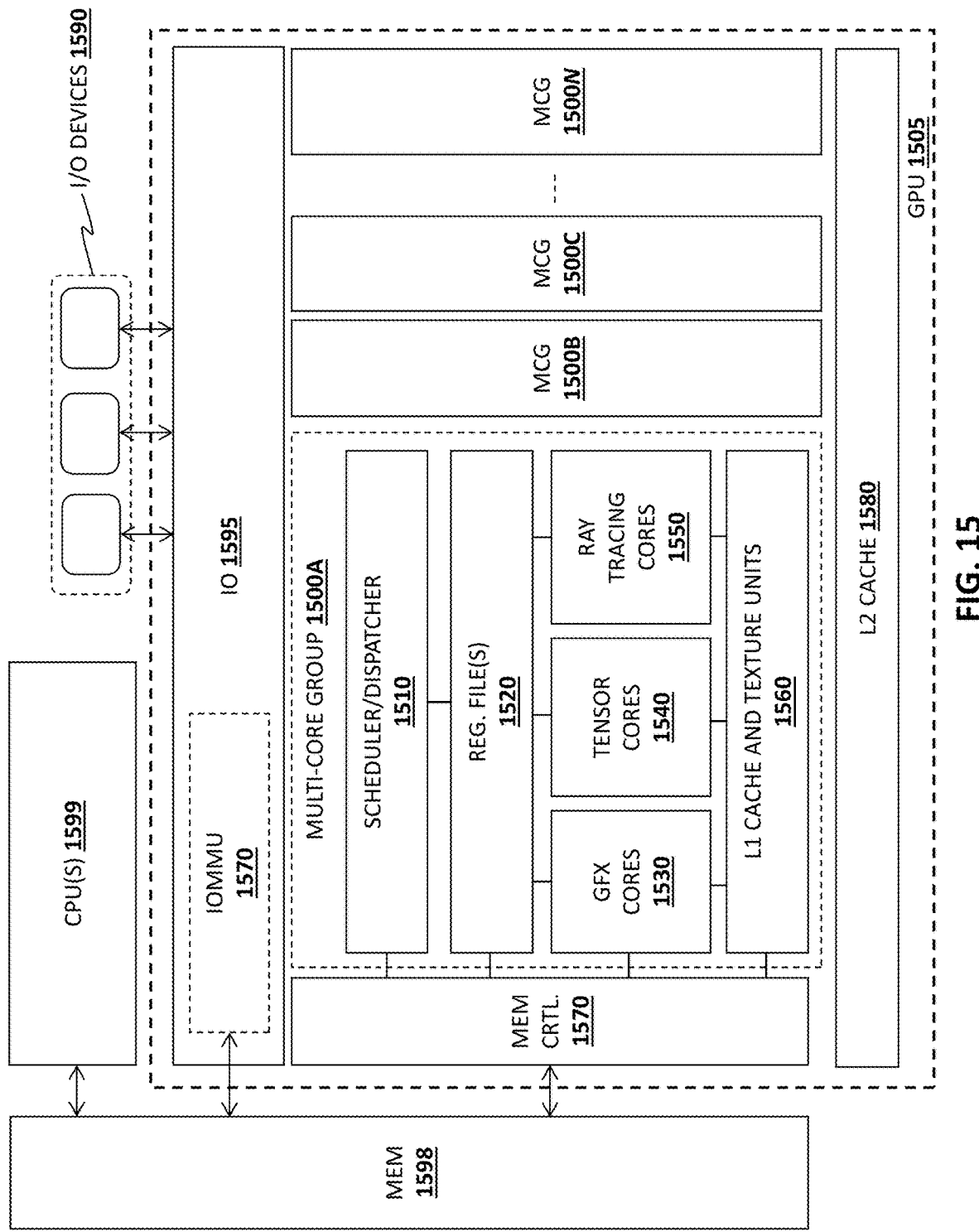
FIG. 15 illustrates an example of a processing architecture which includes ray tracing cores and tensor cores.

FIG. 15 illustrates an exemplary portion of one such graphics processing unit (GPU) 1505 which includes dedicated sets of graphics processing resources arranged into multi-core groups 1500A-N. While the details of only a single multi-core group 1500A are provided, it will be appreciated that the other multi-core groups 1500B-N may be equipped with the same or similar sets of graphics processing resources.

As illustrated, a multi-core group 1500A may include a set of graphics cores 1530, a set of tensor cores 1540, and a set of ray tracing cores 1550. A scheduler/dispatcher 1510 schedules and dispatches the graphics threads for execution on the various cores 1530, 1540, 1550. A set of register files 1520 store operand values used by the cores 1530, 1540, 1550 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more Level 1 (L1) caches and texture units 1560 store graphics data such as texture data, vertex data, pixel data, ray data, bounding volume data, etc, locally within each multi-core group 1500A. A Level 2 (L2) cache 1580 shared by all or a subset of the multi-core groups 1500A-N stores graphics data and/or instructions for multiple concurrent graphics threads. As illustrated, the L2 cache 1580 may be shared across a plurality of multi-core groups 1500A-N. One or more memory controllers 1570 couple the GPU 1505 to a memory 1598 which may be a system memory (e.g., DRAM) and/or a dedicated graphics memory (e.g., GDDR6 memory).

Input/output (IO) circuitry 1595 couples the GPU 1505 to one or more IO devices 1595 such as digital signal processors (DSPs), network controllers, or user input devices. An on-chip interconnect may be used to couple the I/O devices 1590 to the GPU 1505 and memory 1598. One or more IO memory management units (IOMMUs) 1570 of the IO circuitry 1595 couple the IO devices 1590 directly to the system memory 1598. In one embodiment, the IOMMU 1570 manages multiple sets of page tables to map virtual addresses to physical addresses in system memory 1598. In this embodiment, the IO devices 1590, CPU(s) 1599, and GPU(s) 1505 may share the same virtual address space.

In one implementation, the IOMMU 1570 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 1598). The base addresses of each of the first and second sets of page tables may be stored in control registers and swapped out on a context switch (e.g., so that the new context is provided with access to the relevant set of page tables). While not illustrated in FIG. 15, each of the cores 1530, 1540, 1550 and/or multi-core groups 1500A-N may include translation lookaside buffers (TLBs) to cache guest virtual to guest physical translations, guest physical to host physical translations, and guest virtual to host physical translations.

In one embodiment, the CPUs 1599, GPUs 1505, and IO devices 1590 are integrated on a single semiconductor chip and/or chip package. The illustrated memory 1598 may be integrated on the same chip or may be coupled to the memory controllers 1570 via an off-chip interface. In one implementation, the memory 1598 comprises GDDR6 memory which shares the same virtual address space as other physical system-level memories, although the underlying principles of the invention are not limited to this specific implementation.

In one embodiment, the tensor cores 1540 include a plurality of execution units specifically designed to perform matrix operations, which are the fundamental compute operation used to perform deep learning operations. For example, simultaneous matrix multiplication operations may be used for neural network training and inferencing. The tensor cores 1540 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 1540. The training of neural networks, in particular, requires a significant number matrix dot product operations. In order to process an inner-product formulation of an N×N×N matrix multiply, the tensor cores 1540 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 1540 to ensure that the most efficient precision is used for different workloads (e.g., such as inferencing workloads which can tolerate quantization to bytes and half-bytes).

In one embodiment, the ray tracing cores 1550 accelerate ray tracing operations for both real-time ray tracing and non-real-time ray tracing implementations. In particular, the ray tracing cores 1550 include ray traversal/intersection circuitry for performing ray traversal using bounding volume hierarchies (BVHs) and identifying intersections between rays and primitives enclosed within the BVH volumes. The ray tracing cores 1550 may also include circuitry for performing depth testing and culling (e.g., using a Z buffer or similar arrangement). In one implementation, the ray tracing cores 1550 perform traversal and intersection operations in concert with the image denoising techniques described herein, at least a portion of which may be executed on the tensor cores 1540. For example, in one embodiment, the tensor cores 1540 implement a deep learning neural network to perform denoising of frames generated by the ray tracing cores 1550. However, the CPU(s) 1599, graphics cores 1530, and/or ray tracing cores 1550 may also implement all or a portion of the denoising and/or deep learning algorithms.

In addition, as described above, a distributed approach to denoising may be employed in which the GPU 1505 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 1550 process all BVH traversal and ray-primitive intersections, saving the graphics cores 1530 from being overloaded with thousands of instructions per ray. In one embodiment, each ray tracing core 1550 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 1500A can simply launch a ray probe, and the ray tracing cores 1550 independently perform ray traversal and intersection and return hit data (e.g., a hit, no hit, multiple hits, etc) to the thread context. The other cores 1530, 1540 are freed to perform other graphics or compute work while the ray tracing cores 1550 perform the traversal and intersection operations.

In one embodiment, each ray tracing core 1550 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 1530 and tensor cores 1540) are freed to perform other forms of graphics work.

In one particular embodiment described below, a hybrid rasterization/ray tracing approach is used in which work is distributed between the graphics cores 1530 and ray tracing cores 1550.

In one embodiment, the ray tracing cores 1550 (and/or other cores 1530, 1540) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 1550, graphics cores 1530 and tensor cores 1540 is Vulkan 1.1.85. Note, however, that the underlying principles of the invention are not limited to any particular ray tracing ISA.

In general, the various cores 1550, 1540, 1530 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Lossy and Lossless Packet Compression in a Distributed Ray Tracing System

Figure 16:
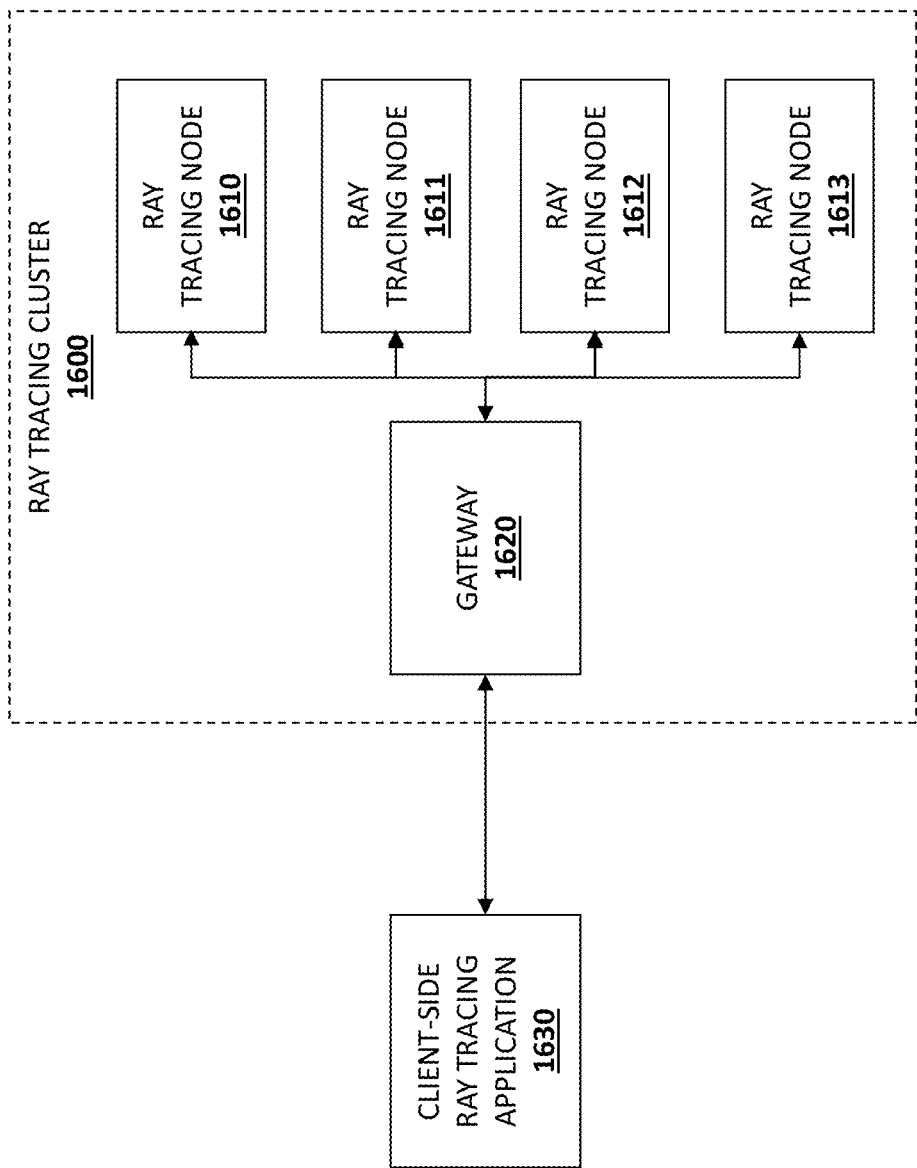
FIG. 16 illustrates a ray tracing cluster of nodes.

In one embodiment, ray tracing operations are distributed across a plurality of compute nodes coupled together over a network. FIG. 16, for example, illustrates a ray tracing cluster 1600 comprising a plurality of ray tracing nodes 1610-1613 perform ray tracing operations in parallel, potentially combining the results on one of the nodes. In the illustrated architecture, the ray tracing nodes 1610-1613 are communicatively coupled to a client-side ray tracing application 1630 via a gateway.

One of the difficulties with a distributed architecture is the large amount of packetized data that must be transmitted between each of the ray tracing nodes 1610-1613. In one embodiment, both lossless compression techniques and lossy compression techniques are used to reduce the data transmitted between the ray tracing nodes 1610-1613.

To implement lossless compression, rather than sending packets filled with the results of certain types of operations, data or commands are sent which allow the receiving node to reconstruct the results. For example, stochastically sampled area lights and ambient occlusion (AO) operations do not necessarily need directions. Consequently, in one embodiment, a transmitting node will simply send a random seed which is then used by the receiving node to perform random sampling. For example, if a scene is distributed across nodes 1610-1612, to sample light 1 at points p1-p3, only the light ID and origins need to be sent to nodes 1610-1612. Each of the nodes may then stochastically sample the light independently. In one embodiment, the random seed is generated by the receiving node. Similarly, for primary ray hit points, ambient occlusion (AO) and soft shadow sampling can be computed on nodes 1610-1612 without waiting for the original points for successive frames. Additionally, if it is known that a set of rays will go to the same point light source, instructions may be sent identifying the light source to the receiving node which will apply it to the set of rays. As another example, if there are N ambient occlusion rays transmitted a single point, a command may be sent to generate N samples from this point.

Various additional techniques may be applied for lossy compression. For example, in one embodiment, a quantization factor may be employed to quantize all coordinate values associated with the BVH, primitives, and rays. In addition, 32-bit floating point values used for data such as BVH nodes and primitives may be converted into 8-bit integer values. In one particular implementation, the bounds of ray packets are stored in in full precision but individual ray points P1-P3 are transmitted as indexed offsets to the bounds. Similarly, a plurality of local coordinate systems may be generated which use 8-bit integer values as local coordinates. The location of the origin of each of these local coordinate systems may be encoded using the full precision (e.g., 32-bit floating point) values, effectively connecting the global and local coordinate systems.

The following is an example of lossless compression employed in one embodiment of the invention. An example of a Ray data format used internally in a ray tracing program is as follows:

```
struct Ray
{
    uint32 pixId;
    uint32 materialID;
    uint32 instanceID;
    uint64 primitiveID;
    uint32 geometryID;
    uint32 lightID;
    float origin[3];
    float direction[3];
    float t0;
    float t;
    float time;
    float normal[3]; //used for geometry intersections
    float u;
    float v;
    float wavelength;
    float phase; //Interferometry
    float refractedOffset; //Schlieren-esque
    float amplitude;
    float weight;
};
```

Instead of sending the raw data for each and every node generated, this data can be compressed by grouping values and by creating implicit rays using applicable metadata where possible.

Bundling and Grouping Ray Data

One embodiment uses flags for common data or masks with modifiers.

```
struct RayPacket
{
    uint32 size;
    uint32 flags;
    list<Ray> rays;
}
For example:
RayPacket.rays = ray_1 to ray_256
```

Origins are all Shared

All ray data is packed, except only a single origin is stored across all rays. RayPacket.flags is set for RAYPACKET_COMMON_ORIGIN. When RayPacket is unpacked when received, origins are filled in from the single origin value.

Origins are Shared Only Among Some Rays

All ray data is packed, except for rays that share origins. For each group of unique shared origins, an operator is packed on that identifies the operation (shared origins), stores the origin, and masks which rays share the information. Such an operation can be done on any shared values among nodes such as material IDs, primitive IDs, origin, direction, normals, etc.

```
struct RayOperation
{
    uint8 operationID;
    void* value;
    uint64 mask;
}
```

Sending Implicit Rays

Often times, ray data can be derived on the receiving end with minimal meta information used to generate it. A very common example is generating multiple secondary rays to stochastically sample an area. Instead of the sender generating a secondary ray, sending it, and the receiver operating on it, the sender can send a command that a ray needs to be generated with any dependent information, and the ray is generated on the receiving end. In the case where the ray needs to be first generated by the sender to determine which receiver to send it to, the ray is generated and the random seed can be sent to regenerate the exact same ray.

For example, to sample a hit point with 64 shadow rays sampling an area light source, all 64 rays intersect with regions from the same compute N4. A RayPacket with common origin and normal is created. More data could be sent if one wished the receiver to shade the resulting pixel contribution, but for this example let us assume we wish to only return whether a ray hits another nodes data. A RayOperation is created for a generate shadow ray operation, and is assigned the value of the lightID to be sampled and the random number seed. When N4 receives the ray packet, it generates the fully filled Ray data by filling in the shared origin data to all rays and setting the direction based on the lightID stochastically sampled with the random number seed to generate the same rays that the original sender generated. When the results are returned, only binary results for every ray need be returned, which can be handed by a mask over the rays.

Sending the original 64 rays in this example would have used 104 Bytes*64 rays=6656 Bytes. If the returning rays were sent in their raw form as well, than this is also doubled to 13312 Bytes. Using lossless compression with only sending the common ray origin, normal, and ray generation operation with seed and ID, only 29 Bytes are sent with 8 Bytes returned for the was intersected mask. This results in a data compression rate that needs to be sent over the network of ~360:1. This does not include overhead to process the message itself, which would need to be identified in some way, but that is left up to the implementation. Other operations may be done for recomputing ray origin and directions from the pixelD for primary rays, recalculating pixelIDs based on the ranges in the raypacket, and many other possible implementations for recomputation of values. Similar operations can be used for any single or group of rays sent, including shadows, reflections, refraction, ambient occlusion, intersections, volume intersections, shading, bounced reflections in path tracing, etc.

Figure 17:
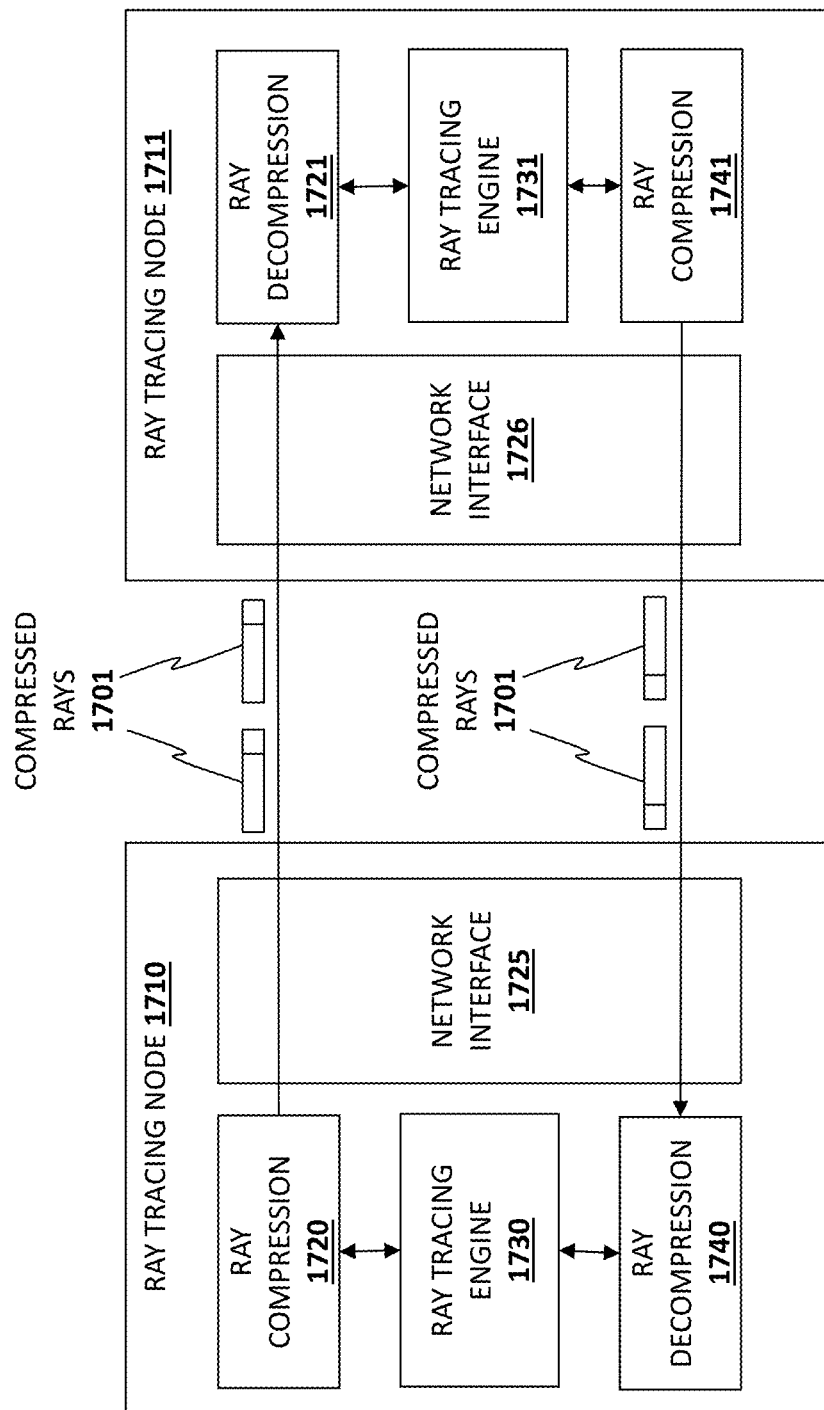
FIG. 17 illustrates additional details for example ray tracing nodes.

FIG. 17 illustrates additional details for two ray tracing nodes 1710-1711 which perform compression and decompression of ray tracing packets. In particular, in one embodiment, when a first ray tracing engine 1730 is ready to transmit data to a second ray tracing engine 1731, ray compression circuitry 1720 performs lossy and/or lossless compression of the ray tracing data as described herein (e.g., converting 32-bit values to 8-bit values, substituting raw data for instructions to reconstruct the data, etc). The compressed ray packets 1701 are transmitted from network interface 1725 to network interface 1726 over a local network (e.g., a 10 Gb/s, 100 Gb/s Ethernet network). Ray decompression circuitry then decompresses the ray packets when appropriate. For example, it may execute commands to reconstruct the ray tracing data (e.g., using a random seed to perform random sampling for lighting operations). Ray tracing engine 1731 then uses the received data to perform ray tracing operations.

In the reverse direction, ray compression circuitry 1741 compresses ray data, network interface 1726 transmits the compressed ray data over the network (e.g., using the techniques described herein), ray decompression circuitry 1740 decompresses the ray data when necessary and ray tracing engine 1730 uses the data in ray tracing operations. Although illustrated as a separate unit in FIG. 17, ray decompression circuitry 1740-1741 may be integrated within ray tracing engines 1730-1731, respectively. For example, to the extent the compressed ray data comprises commands to reconstruct the ray data, these commands may be executed by each respective ray tracing engine 1730-1731.

Figure 18:
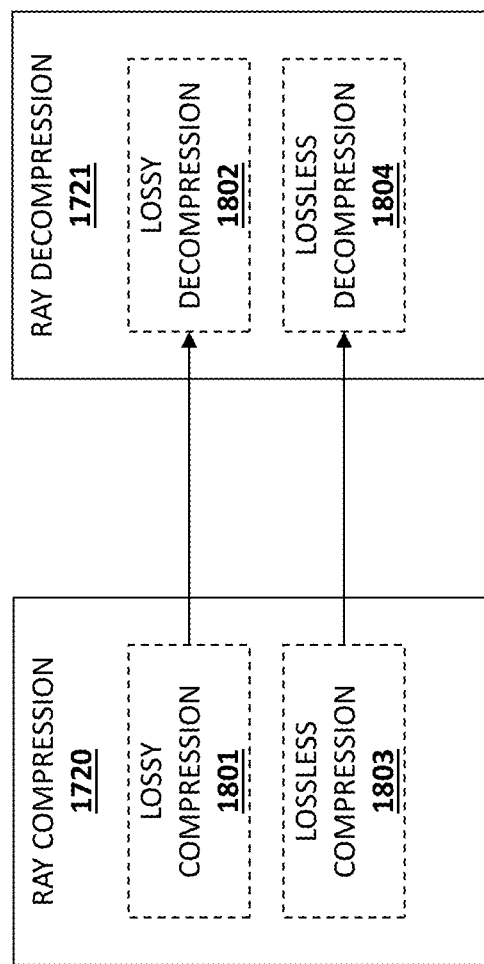
FIG. 18 illustrates ray compression/decompression employed in one embodiment.

As illustrated in FIG. 18, ray compression circuitry 1720 may include lossy compression circuitry 1801 for performing the lossy compression techniques described herein (e.g., converting 32-bit floating point coordinates to 8-bit integer coordinates) and lossless compression circuitry 1803 for performing the lossless compression techniques (e.g., transmitting commands and data to allow ray recompression circuitry 1821 to reconstruct the data). Ray decompression circuitry 1721 includes lossy decompression circuitry 1802 and lossless decompression circuitry 1804 for performing lossless decompression.

A method in accordance with one embodiment is illustrated in FIG. 39. The method may be implemented on the ray tracing architectures described herein but is not limited to any particular architecture.

At 3900, ray data is received which will be transmitted from a first ray tracing node to a second ray tracing node. At 3901, lossy compression circuitry performs lossy compression on first ray tracing data and, at 3902, lossless compression circuitry performs lossless compression on second ray tracing data. At 3903, the compressed ray racing data is transmitted to a second ray tracing node. At 3904, lossy/lossless decompression circuitry performs lossy/lossless decompression of the ray tracing data and, at 3905, the second ray tracing node performs ray tracing operations sing the decompressed data.

Graphics Processor with Hardware Accelerated Hybrid Ray Tracing

One embodiment of the invention includes a hybrid rendering pipeline which performs rasterization on graphics cores 1530 and ray tracing operations on the ray tracing cores 1550, graphics cores 1530, and/or CPU 1599 cores. For example, rasterization and depth testing may be performed on the graphics cores 1530 in place of the primary ray casting stage. The ray tracing cores 1550 may then generate secondary rays for ray reflections, refractions, and shadows. In addition, certain embodiments may select certain regions of a scene in which the ray tracing cores 1550 will perform ray tracing operations (e.g., based on material property thresholds such as high reflectivity levels) while other regions of the scene will be rendered with rasterization on the graphics cores 1530. In one embodiment, this hybrid implementation is used for real-time ray tracing applications—where latency is a critical issue.

One embodiment of the ray traversal architecture described below performs programmable shading and control of ray traversal using existing single instruction multiple data (SIMD) and/or single instruction multiple thread (SIMT) graphics processors while accelerating critical functions, such as BVH traversal and/or intersections, using dedicated hardware. In this embodiment, SIMD occupancy for incoherent paths is improved by regrouping spawned shaders at specific points during traversal and before shading. This is achieved using dedicated hardware that sorts shaders dynamically, on-chip. Recursion is managed by splitting a function into continuations that execute upon returning and regrouping continuations before execution for improved SIMD occupancy.

Programmable control of ray traversal/intersection is achieved by decomposing traversal functionality into an inner traversal that can be implemented as fixed function hardware and an outer traversal that executes on GPU processors and enables programmable control through user defined traversal shaders. The cost of transferring the traversal context between hardware and software is reduced by conservatively truncating the inner traversal state during the transition between inner and outer traversal.

Programmable control of ray tracing can be expressed through the different shader types listed in Table A below. There can be multiple shaders for each type. For example each material can have a different hit shader.

TABLE A

| Shader Type | Functionality |
|---|---|
| Primary | Launching primary rays |
| Hit | Bidirectional reflectance distribution function (BRDF) sampling, launching secondary rays |
| Any Hit | Computing transmittance for alpha textured geometry |
| Miss | Computing radiance from a light source |
| Intersection | Intersecting custom shapes |
| Traversal | Instance selection and transformation |
| Callable | A general-purpose function |

In one embodiment, recursive ray tracing is initiated by an API function that commands the graphics processor to launch a set of primary shaders or intersection circuitry which can spawn ray-scene intersections for primary rays. This in turn spawns other shaders such as traversal, hit shaders, or miss shaders. A shader that spawns a child shader can also receive a return value from that child shader. Callable shaders are general-purpose functions that can be directly spawned by another shader and can also return values to the calling shader.

Figure 19:
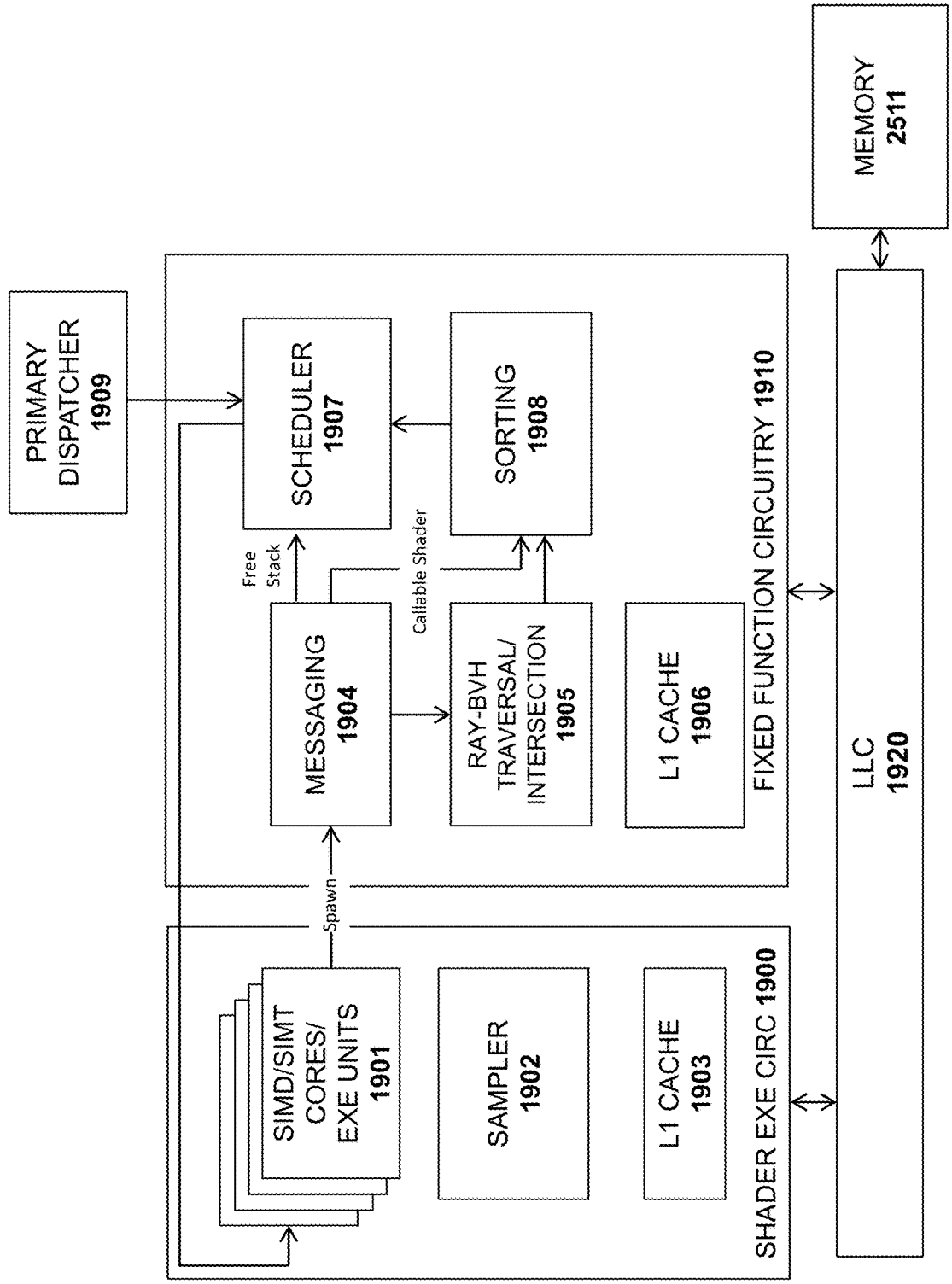
FIG. 19 illustrates one embodiment of a hybrid ray tracing architecture.

FIG. 19 illustrates an embodiment of a graphics processing architecture which includes shader execution circuitry 1900 and fixed function circuitry 1910. The general purpose execution hardware subsystem includes a plurality of single instruction multiple data (SIMD) and/or single instructions multiple threads (SIMT) cores/execution units (EUs) 1901 (i.e., each core may comprise a plurality of execution units), one or more samplers 1902, and a Level 1 (L1) cache 1903 or other form of local memory. The fixed function hardware subsystem 1910 includes message unit 1904, a scheduler 1907, ray-BVH traversal/intersection circuitry 1905, sorting circuitry 1908, and a local L1 cache 1906.

In operation, primary dispatcher 1909 dispatches a set of primary rays to the scheduler 1907, which schedules work to shaders executed on the SIMD/SIMT cores/EUs 1901. The SIMD cores/EUs 1901 may be ray tracing cores 1550 and/or graphics cores 1530 described above. Execution of the primary shaders spawns additional work to be performed (e.g., to be executed by one or more child shaders and/or fixed function hardware). The message unit 1904 distributes work spawned by the SIMD cores/EUs 1901 to the scheduler 1907, accessing the free stack pool as needed, the sorting circuitry 1908, or the ray-BVH intersection circuitry 1905. If the additional work is sent to the scheduler 1907, it is scheduled for processing on the SIMD/SIMT cores/EUs 1901. Prior to scheduling, the sorting circuitry 1908 may sort the rays into groups or bins as described herein (e.g., grouping rays with similar characteristics). The ray-BVH intersection circuitry 1905 performs intersection testing of rays using BVH volumes. For example, the ray-BVH intersection circuitry 1905 may compare ray coordinates with each level of the BVH to identify volumes which are intersected by the ray.

Shaders can be referenced using a shader record, a user-allocated structure that includes a pointer to the entry function, vendor-specific metadata, and global arguments to the shader executed by the SIMD cores/EUs 1901. Each executing instance of a shader is associated with a call stack which may be used to store arguments passed between a parent shader and child shader. Call stacks may also store references to the continuation functions that are executed when a call returns.

Figure 20:
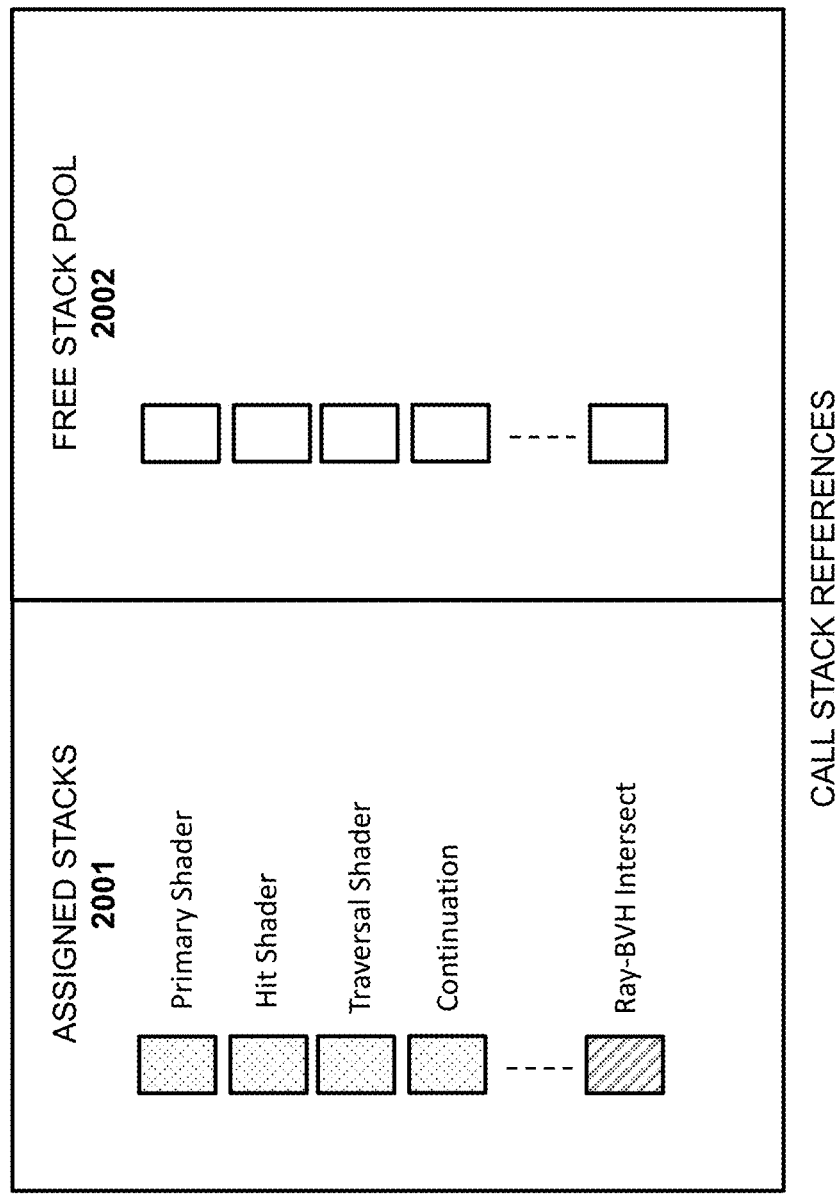
FIG. 20 illustrates example call stack references.

FIG. 20 illustrates an example set of assigned stacks 2001 which includes a primary shader stack, a hit shader stack, a traversal shader stack, a continuation function stack, and a ray-BVH intersection stack (which, as described, may be executed by fixed function hardware 1910). New shader invocations may implement new stacks from a free stack pool 2002. The call stacks may be cached in a local L1 cache 1903, 1906 to reduce the latency of accesses.

In one embodiment, there are a finite number of call stacks, each with a fixed maximum size "Sstack" allocated in a contiguous region of memory. Therefore the base address of a stack can be directly computed from a stack index (SID) as base address=SID*Sstack. In one embodiment, stack IDs are allocated and deallocated by the scheduler 1907 when scheduling work to the SIMD cores/EUs 1901.

In one embodiment, the primary dispatcher 1909 comprises a graphics processor command processor which dispatches primary shaders in response to a dispatch command from the host (e.g., a CPU). The scheduler 1907 receives these dispatch requests and launches a primary shader on a SIMD processor thread if it can allocate a stack ID for each SIMD lane. Stack IDs are allocated from the free stack pool 2002 that is initialized at the beginning of the dispatch command.

An executing shader can spawn a child shader by sending a spawn message to the messaging unit 1904. This command includes the stack IDs associated with the shader and also includes a pointer to the child shader record for each active SIMD lane. A parent shader can only issue this message once for an active lane. In one embodiment, after sending spawn messages for all relevant lanes, the parent shader terminates.

A shader executed on the SIMD cores/EUs 1901 can also spawn fixed-function tasks such as ray-BVH intersections using a spawn message with a shader record pointer reserved for the fixed-function hardware. As mentioned, the messaging unit 1904 sends spawned ray-BVH intersection work to the fixed-function ray-BVH intersection circuitry 1905 and callable shaders directly to the sorting circuitry 1908. In one embodiment, the sorting circuitry groups the shaders by shader record pointer to derive a SIMD batch with similar characteristics. Accordingly, stack IDs from different parent shaders can be grouped by the sorting circuitry 1908 in the same batch. The sorting circuitry 1908 sends grouped batches to the scheduler 1907 which accesses the shader record from graphics memory 2511 or the last level cache (LLC) 1920 and launches the shader on a processor thread.

In one embodiment, continuations are treated as callable shaders and may also be referenced through shader records. When a child shader is spawned and returns values to the parent shader, a pointer to the continuation shader record is pushed on the call stack 2001. When a child shader returns, the continuation shader record is popped from the call stack 2001 and a continuation shader is spawned. Spawned continuations go through the sorting unit similar to callable shaders and get launched on a processor thread.

Figure 21:
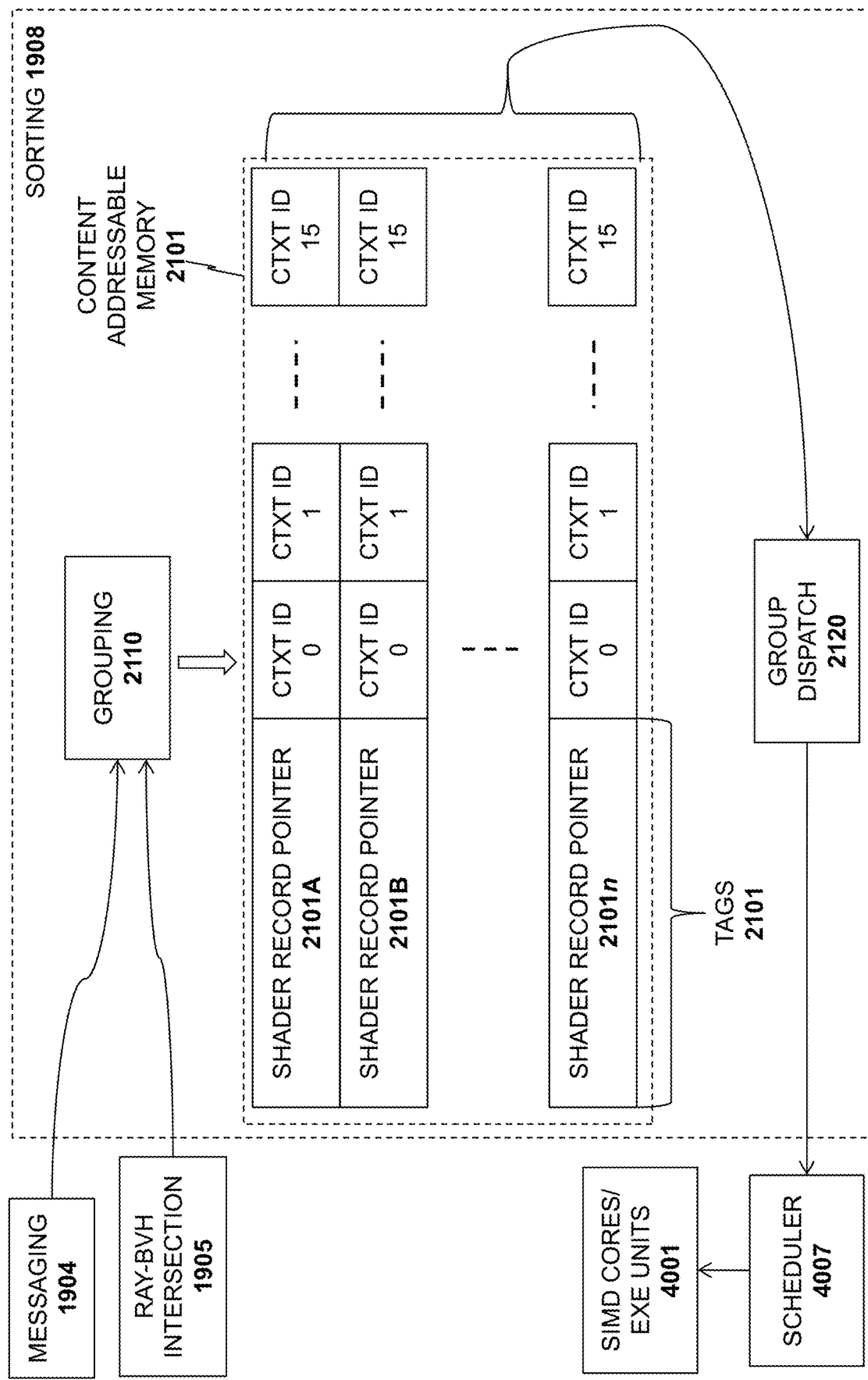
FIG. 21 illustrates an example set of shader record pointers.

As illustrated in FIG. 21, one embodiment of the sorting circuitry 1908 groups spawned tasks by shader record pointers 2101A, 2101B, 2101n to create SIMD batches for shading. The stack IDs or context IDs in a sorted batch can be grouped from different dispatches and different input SIMD lanes. In one embodiment, grouping circuitry 2110 performs the sorting using a content addressable memory (CAM) structure 2101 comprising a plurality of entries with each entry identified with a tag 2101. As mentioned, in one embodiment, the tag 2101 is a corresponding shader record pointer 2101A, 2101B, 2101n. In one embodiment, the CAM structure 2101 stores a limited number of tags (e.g. 32, 64, 128, etc) each associated with an incomplete SIMD batch corresponding to a shader record pointer.

For an incoming spawn command, each SIMD lane has a corresponding stack ID (shown as 16 context IDs 0-15 in each CAM entry) and a shader record pointer 2101A-B, . . . n (acting as a tag value). In one embodiment, the grouping circuitry 2110 compares the shader record pointer for each lane against the tags 2101 in the CAM structure 2101 to find a matching batch. If a matching batch is found, the stack ID/context ID is added to the batch. Otherwise a new entry with a new shader record pointer tag is created, possibly evicting an older entry with an incomplete batch.

An executing shader can deallocate the call stack when it is empty by sending a deallocate message to the message unit. The deallocate message is relayed to the scheduler which returns stack IDs/context IDs for active SIMD lanes to the free pool.

Figure 22:
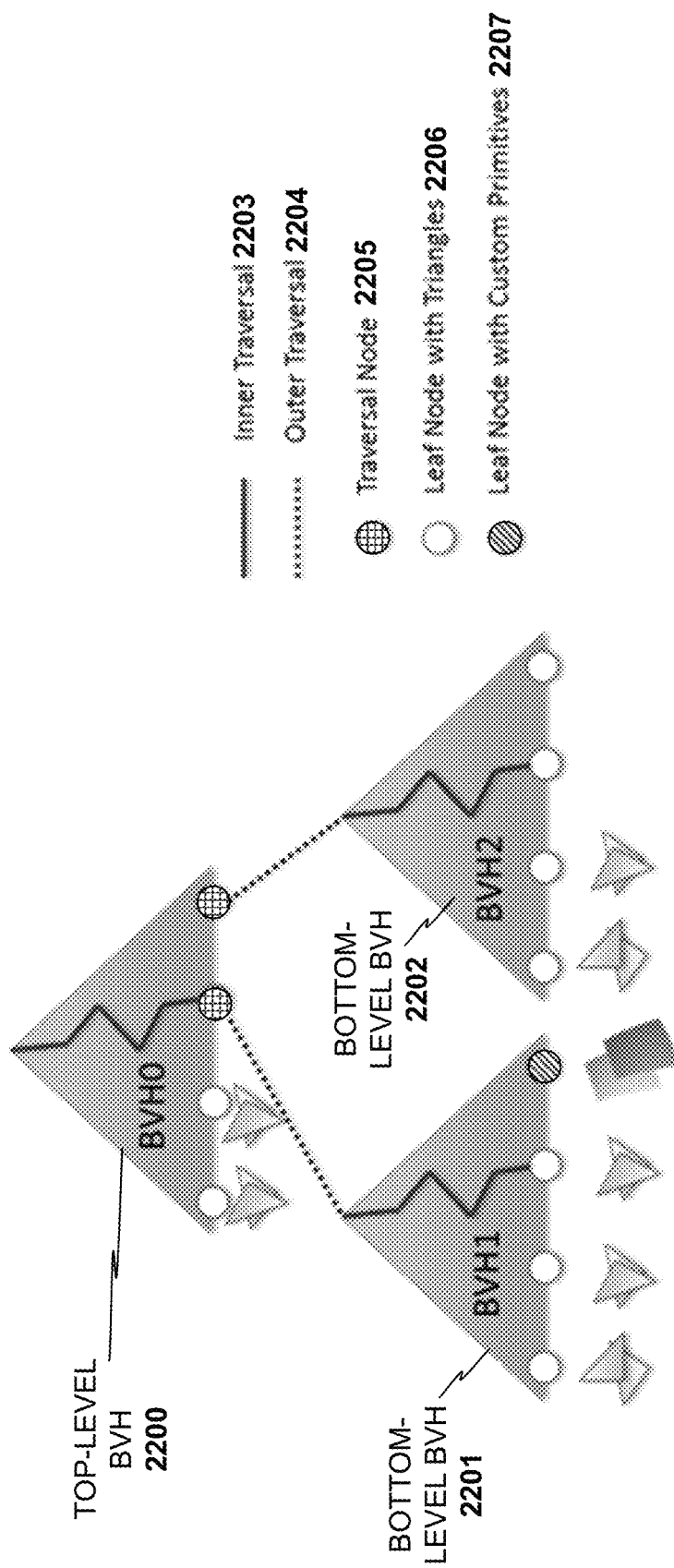
FIG. 22 illustrates an example of a bounding volume hierarchy.

One embodiment of the invention implements a hybrid approach for ray traversal operations, using a combination of fixed-function ray traversal and software ray traversal. Consequently, it provides the flexibility of software traversal while maintaining the efficiency of fixed-function traversal. FIG. 22 shows an acceleration structure which may be used for hybrid traversal, which is a two-level tree with a single top level BVH 2200 and several bottom level BVHs 2201 and 2202. Graphical elements are shown to the right to indicate inner traversal paths 2203, outer traversal paths 2204, traversal nodes 2205, leaf nodes with triangles 2206, and leaf nodes with custom primitives 2207.

The leaf nodes with triangles 2206 in the top level BVH 2200 can reference triangles, intersection shader records for custom primitives or traversal shader records. The leaf nodes with triangles 2206 of the bottom level BVHs 2201-2202 can only reference triangles and intersection shader records for custom primitives. The type of reference is encoded within the leaf node 2206. Inner traversal 2203 refers to traversal within each BVH 2200-2202. Inner traversal operations comprise computation of ray-BVH intersections and traversal across the BVH structures 2200-2202 is known as outer traversal. Inner traversal operations can be implemented efficiently in fixed function hardware while outer traversal operations can be performed with acceptable performance with programmable shaders. Consequently, one embodiment of the invention performs inner traversal operations using fixed-function circuitry 1910 and performs outer traversal operations using the shader execution circuitry 1900 including SIMD cores/EUs 1901 for executing programmable shaders.

In one embodiment, when a ray intersects a traversal node during an inner traversal, a traversal shader is spawned. The sorting circuitry 1908 groups these shaders by shader record pointers 2101A-B, n to create a SIMD batch which is launched by the scheduler 1907 for SIMD execution on the graphics SIMD cores/EUs 1901. Traversal shaders can modify traversal in several ways, enabling a wide range of applications. For example, the traversal shader can select a BVH at a coarser level of detail (LOD) or transform the ray to enable rigid body transformations. The traversal shader then spawns inner traversal for the selected BVH.

Inner traversal computes ray-BVH intersections by traversing the BVH and computing ray-box and ray-triangle intersections. Inner traversal is spawned in the same manner as shaders by sending a message to the messaging circuitry 1904 which relays the corresponding spawn message to the ray-BVH intersection circuitry 1905 which computes ray-BVH intersections.

In one embodiment, the stack for inner traversal is stored locally in the fixed-function circuitry 1910 (e.g., within the L1 cache 1906). When a ray intersects a leaf node corresponding to a traversal shader or an intersection shader, inner traversal is terminated and the inner stack is truncated. The truncated stack along with a pointer to the ray and BVH is written to memory at a location specified by the calling shader and then the corresponding traversal shader or intersection shader is spawned. If the ray intersects any triangles during inner traversal, the corresponding hit information is provided as input arguments to these shaders as shown in the below code. These spawned shaders are grouped by the sorting circuitry 1908 to create SIMD batches for execution.

```
struct HitInfo {
    float barycentrics[2];
    float tmax;
    bool innerTravComplete;
    uint primID;
    uint geomID;
    ShaderRecord* leafShaderRecord;
}
```

Truncating the inner traversal stack reduces the cost of spilling it to memory. One embodiment of the invention uses the approach described in *Restart Trail for Stackless BVH Traversal*, High Performance Graphics (2010), pp. 107-111, to truncate the stack to a small number of entries at the top of the stack, a 42-bit restart trail and a 6-bit depth value. The restart trail indicates branches that have already been taken inside the BVH and the depth value indicates the depth of traversal corresponding to the last stack entry. This is sufficient information to resume inner traversal at a later time.

Inner traversal is complete when the inner stack is empty and there no more BVH nodes to test. In this case an outer stack handler is spawned that pops the top of the outer stack and resumes traversal if the outer stack is not empty.

In one embodiment, outer traversal executes the main traversal state machine and is implemented in program code executed by the shader execution circuitry 1900. It spawns an inner traversal query under the following conditions: (1) when a new ray is spawned by a hit shader or a primary shader; (2) when a traversal shader selects a BVH for traversal; and (3) when an outer stack handler resumes inner traversal for a BVH.

Figure 23:
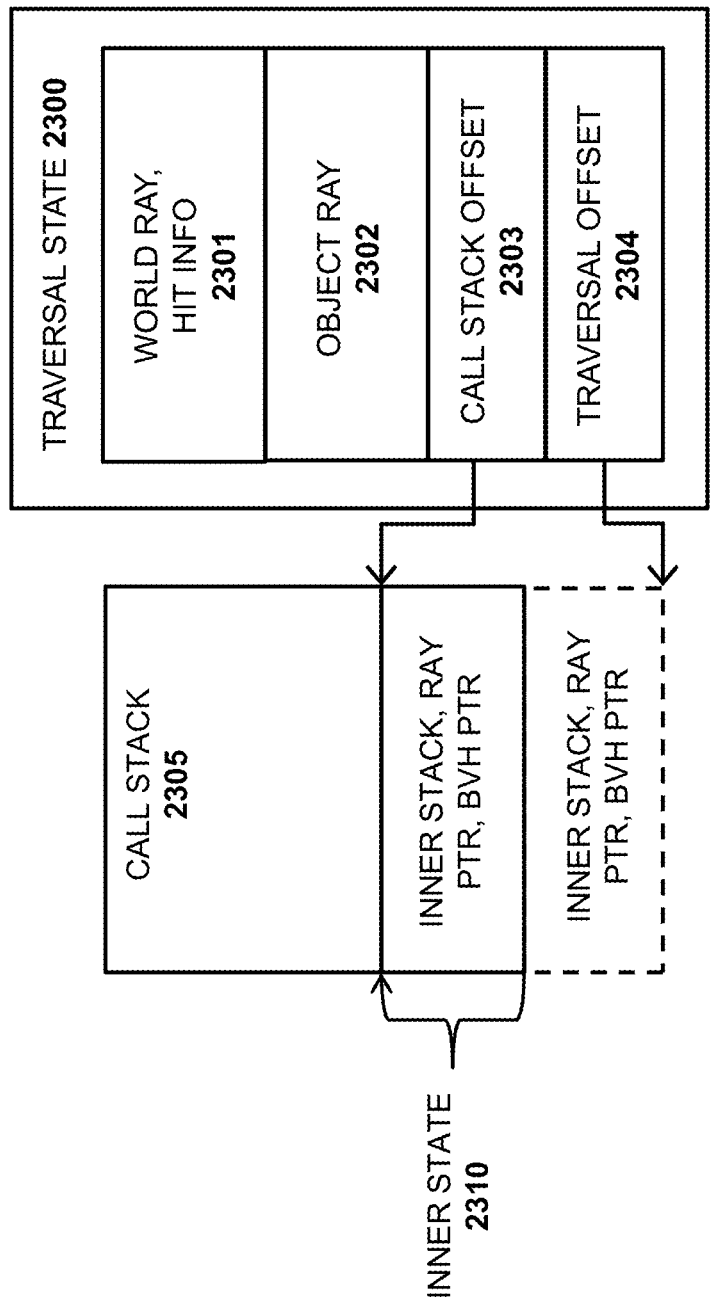
FIG. 23 illustrates one embodiment of a call stack and associated traversal state.

As illustrated in FIG. 23, before inner traversal is spawned, space is allocated on the call stack 2305 for the fixed-function circuitry 1910 to store the truncated inner stack 2310. Offsets 2303-2304 to the top of the call stack and the inner stack are maintained in the traversal state 2300 which is also stored in memory 2511. The traversal state 2300 also includes the ray in world space 2301 and object space 2302 as well as hit information for the closest intersecting primitive.

The traversal shader, intersection shader and outer stack handler are all spawned by the ray-BVH intersection circuitry 1905. The traversal shader allocates on the call stack 2305 before initiating a new inner traversal for the second level BVH. The outer stack handler is a shader that is responsible for updating the hit information and resuming any pending inner traversal tasks. The outer stack handler is also responsible for spawning hit or miss shaders when traversal is complete. Traversal is complete when there are no pending inner traversal queries to spawn. When traversal is complete and an intersection is found, a hit shader is spawned; otherwise a miss shader is spawned.

While the hybrid traversal scheme described above uses a two-level BVH hierarchy, the embodiments of the invention described herein may use an arbitrary number of BVH levels with a corresponding change in the outer traversal implementation.

In addition, while fixed function circuitry 1910 is described for performing ray-BVH intersections in the above embodiments, other system components may also be implemented in fixed function circuitry. For example, the outer stack handler described above may be an internal (not user visible) shader that could potentially be implemented in the fixed function BVH traversal/intersection circuitry 1905. This implementation may be used to reduce the number of dispatched shader stages and round trips between the fixed function intersection hardware 1905 and the processor.

The embodiments of the invention described here enable programmable shading and ray traversal control using user-defined functions that can execute with greater SIMD efficiency on existing and future GPU processors. Programmable control of ray traversal enables several important features such as procedural instancing, stochastic level-of-detail selection, custom primitive intersection and lazy BVH updates.

Apparatus and Method for Quantized, Convergent, Direction-Based Ray Sorting

In hardware ray tracing with a SIMD architecture, one of the fundamental problems is to keep all the SIMD lanes effectively utilized. For example, each lane may concurrently operate on a separate ray and the rays may be completely independent of each other. In order to be dispatched together, rays need to share common properties such as shader program code and texture resources.

Additionally, it is desirable for the rays to share a common direction and intersect the same object in the same general area. This improves cache utilization because these rays will most likely use texture data that is also spaced closely together.

The embodiments of the invention provide a power-efficient hardware solution to quickly determine the approximate incoming direction of a ray from the point of view of the intersected object, based on its BVH bounding box. This approximation may then be used to group dispatched rays by incoming direction.

In particular, one embodiment groups the rays based on both estimated incoming direction and shader record ID, a user-allocated structure that includes a pointer to the entry function, vendor-specific metadata, and global arguments to the shader executed by the SIMD cores/EUs. For example, this embodiment groups rays that are converging on the same intersection point. To do so, rough intersection coordinates are determined with the bounding box of the target object and appended to the shader record ID to create a compound sort key. Rays that roughly intersect the bounding box in the same location have improved chances of being co-located in the object's texture space.

Additionally, the resulting secondary rays such as reflection rays, shadow rays, etc., have an improved chance of also sharing the same general direction. Therefore, they may be grouped together using the same techniques during the secondary ray dispatch. Rays intersecting different instances of the same object may also be grouped.

Figure 24:
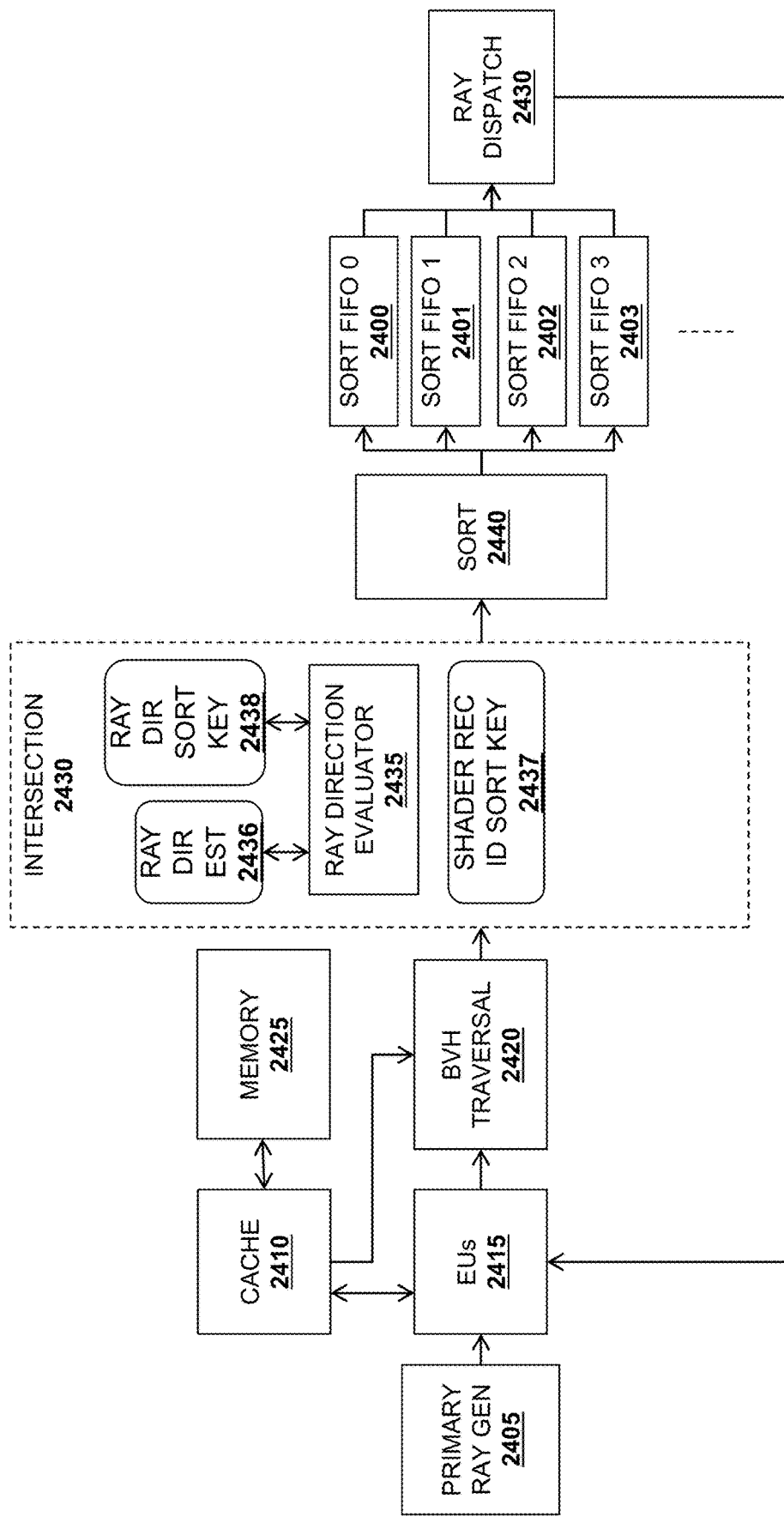
FIG. 24 illustrates one embodiment of the invention for sorting rays.

In one embodiment illustrated in FIG. 24 a primary ray generation shader 2405 executed on one or more execution units (EUs) generates sets of primary rays. Ray traversal circuitry/logic 2420 traverses the rays through a constructed bounding volume hierarchy (BVH) to identify volumes through which the rays pass. Intersection circuitry 2430 performs intersection tests to identify objects within the volumes which are intersected by the rays.

One embodiment of the intersection circuitry 2430 includes ray direction evaluation circuitry/logic 2435 to process an estimated incoming direction 2436 of each of the rays using the techniques described below. In one embodiment, the ray direction evaluator 2435 generates a ray direction sort key 2438 based on the estimated ray direction 2436.

Ray sort circuitry/logic 2440 sorts the rays based on the estimated ray direction 2436 and/or ray direction sort key 2438 in combination with the shader record ID 2437. In one embodiment, the rays are sorted into groups within a plurality of sort FIFO queues 2400-2403. A ray dispatcher 2430 then dispatches the groups of rays from the sort FIFOs 2400-2403 to the EUs 2415 for further processing, traversal and intersection operations.

As mentioned, one embodiment of the ray direction evaluator 2435 determines the approximate ray direction 2436 from an efficient ray/bounding box test. It then constructs a direction sort key 2438 based on the approximate ray direction which uses a small number of bits to encode the ray's direction. The sort circuitry/logic 2440 uses the direction sort key in combination with a shader record ID sort key (e.g., a concatenation of the shader record ID and additional configurable fields) to group the ray traffic in the different sort FIFOs 2400-2403.

In one embodiment, the ray direction evaluator 2435 generates a quantized ray direction using the bounding box around the object that is based on the BVH leaf node's bounding box. Because this BVH data is already present, obtaining the BVH leaf node requires no additional effort to obtain. In addition, a ray/leaf node box test is performed as part of normal ray tracing operations. One embodiment of the ray direction evaluator 2435 enhances the ray/box intersection test to extract the intersected face, and low-resolution intersection coordinates with that face.

In one embodiment, uniquely identifying the intersected node in the sort key is not required. This allows rays intersecting different instances of the same object to be grouped. Having a match on the shader record ID guards against grouping completely unrelated rays intersecting unrelated objects. This is particularly beneficial for scenes which include many repeated structures.

Figure 25:
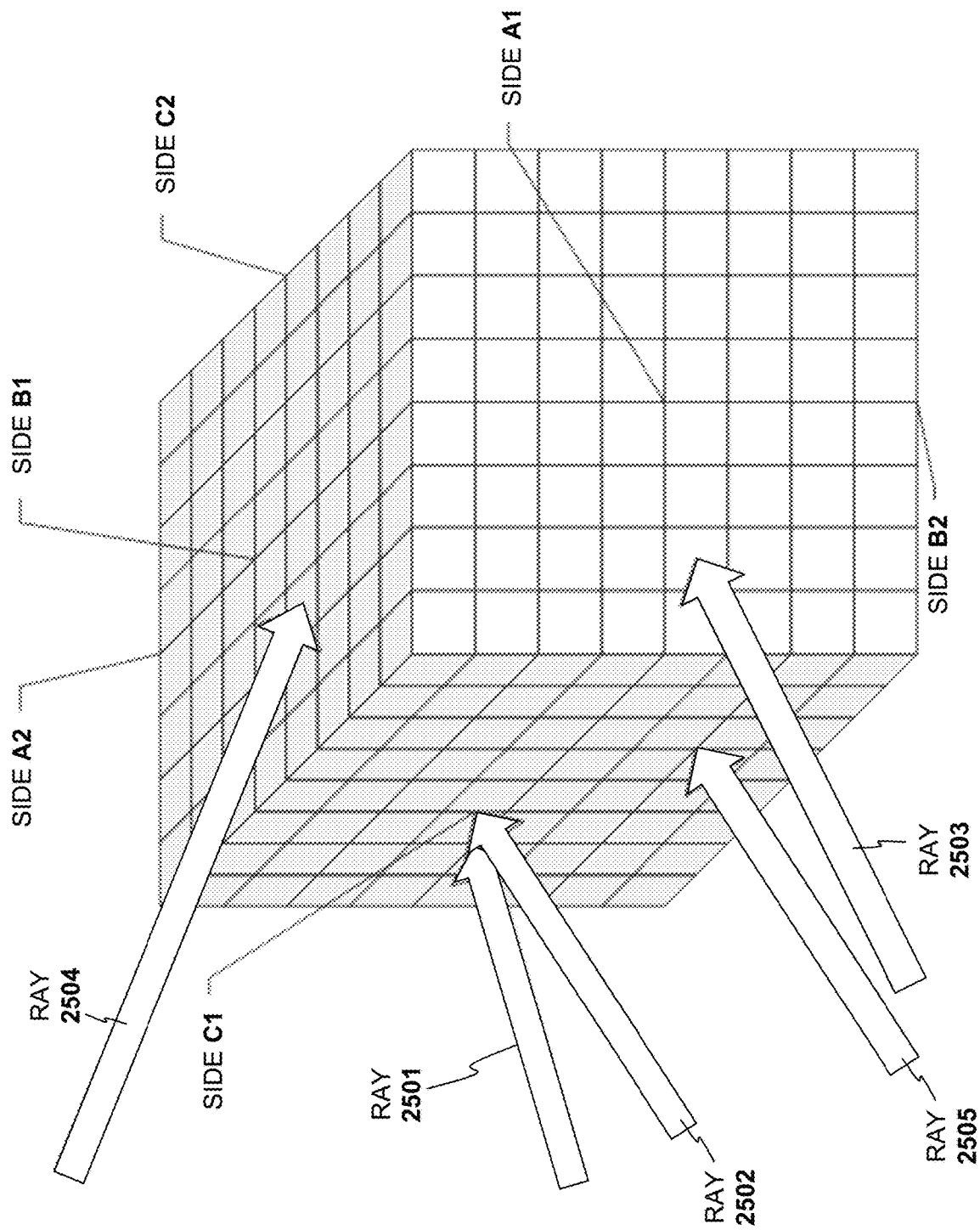
FIG. 25 illustrates an example set of rays intersecting a volume.

FIG. 25 illustrates an example volume intersected by rays 2501-2505 with six walls A1-A2, B1-B2, and C1-C2. In one embodiment, while checking for bounding box intersection, the ray direction evaluator 2435 detects which of the six walls A1-A2, B1-B2, and C1-C2 were intersected. In one embodiment, the ray direction evaluator 2435 assigns opposite sides of the volume identical encodings because rays generally intersect the object from one general side of the scene. This way there are only three unique side encodings: A, B, and C, which may be encoded in a 2-bit number. It is very unlikely for rays to come from exactly opposite sides of the object. If this happens, then the ray direction evaluator 2435 can gracefully revert to using the shader record ID 2437 for grouping.

In one embodiment, 2-dimensional ray intersection coordinates are generated to identify the intersection point on the intersected wall. These coordinates are than reduced in precision such that they can fit within a sort key of a specified size. By way of example, and not limitation, intersection calculations can be performed in reduced precision floating point formats or fixed point formats (e.g., Int4, Int8, Bfloat16, etc). In one particular implementation, 3-bit precision is used to encode each of the 2D coordinates. Thus, a 2-bit side encoding, and 3-bit values for each of U and V can be packed within an 8-bit field of the sort key.

This low coordinate resolution has numerous benefits. First, given that the sort key size is not often increased, an 8-bit value is a reasonable compromise. Rays are only roughly grouped by their intersection points without starving the dispatcher 2430 by waiting for a ray that is very closely packed with the ones already waiting. The circuitry required to create the ray/bounding box intersection points described herein can take advantage of existing traversal/intersection circuitry and operations. The embodiments of the invention will not require the significant number of additional gates typically associated with precise floating-point calculations.

The creation of a quantized direction sort key will be described with respect to FIG. 25. Rays 2501 and 2502 should be dispatched together because they will intersect the object contained within this bounding box in a similar location. Rays 2503 and 2504 are not co-located because they intersect different walls of the bounding box (i.e., as indicated by different side IDs). Ray 2505 hits the same wall as 2501 and 2502 but at a different location. Consequently, Ray 2505 will have the same side ID but different U/V coordinates.

FIG. 26 illustrates one embodiment of a sort key 2600 comprising a shader record key 2601 and an intersection key 2602. The intersection key of this embodiment comprise the 8-bit values described above—i.e., 6 bits for the U and V coordinates (i.e., bits 39:34) and a 2-bit side ID (i.e., bits 33:32). The bits of the 8-bit intersection key 2602 which change most frequently (i.e., the U[0] and V[0] values) are encoded in the most significant bit positions of the sort key 2600. In a way, the bits are sorted by their entropy. The reason for this particular swizzle is that the sort accuracy can be easily adjusted by changing only the number of sort key bits to match. In one implementation, the lowest accuracy (1) is achieved by matching only the least significant 32 bits, which encode the shader record ID (i.e., bits 31:0). The highest accuracy (5) is achieved by matching all 40 bits.

Figure 27:
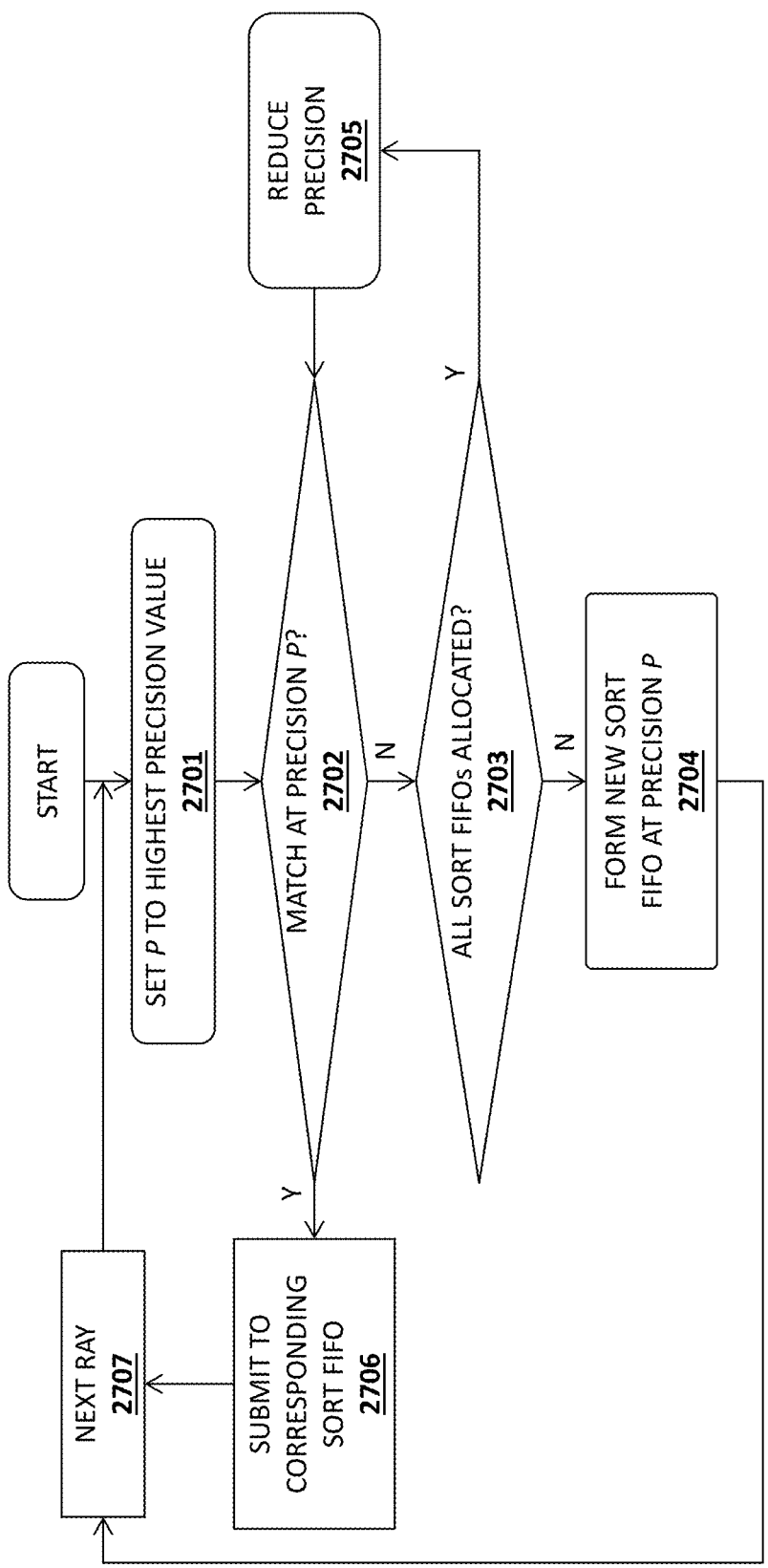
FIG. 27 illustrates a method in accordance with one embodiment of the invention.

In one embodiment, the sorting circuitry/logic 2440 uses the adjustable sort key accuracy and fills the sort FIFOs 2403 in accordance with the following set of rules, described with respect to the flowchart in FIG. 27.

At 2701, when a new ray is received for sorting, the precision P is initially set to the highest value (e.g., 40 bits in one embodiment). If a match is found, determined at 2702, then the ray is submitted to the corresponding sort FIFO at 2706. If a match is not found at 2702 and if all sort FIFOs are allocated, determined at 2703, then precision is reduced by a specified increment at 2705. An attempt to locate a match at the lower precision is made at 2702 and, if one is found, the ray is added to the sort FIFO at 2706. If not, then the precision may continue to be lowered at 2705 until a match is found at 2702.

If sort FIFOs are available at 2703, after determining no match at 2702, then a new sort FIFO is formed at 2704 at the current precision P (e.g., the highest precision). As mentioned, the new sort FIFO may have the same shader record key 2601 as an existing sort FIFO (but with a different intersection key). The current ray is added to the new sort FIFO and the next ray is selected at 2707.

Thus, in this embodiment, when all sort FIFOs 2400-2403 are allocated and there are no exact 40-bit sort key matches, the precision is reduced until a match is found or until the precision has reached a minimum value (i.e., the 32-bit shader record ID 2601). When some sort FIFOs are available and there is no exact 40-bit sort key match, a new sort FIFO is formed for this unmatched sort key. The shader record ID may thus be duplicated across multiple FIFOs. In one embodiment, during forced eviction of partially occupied sort FIFOs, rays may be combined across different sort FIFOs as long as the shader record IDs 2601 match.

This approach improves the memory efficiency of the hardware ray tracing, which improves performance as well as reduces power consumption. Ray tracing is said to replace traditional rasterization techniques in the future. We need to be highly competitive on performance in order to win the high-end graphics market segment.

In embodiments, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine, module, or logic may be implemented in firmware, hardware, software, or any combination of firmware, hardware, and software.

EXAMPLES

The following are example implementations of different embodiments of the invention.

Example 1. An apparatus comprising: a ray generator to generate a plurality of rays; ray direction evaluation circuitry/logic to generate approximate ray direction data for each of the plurality of rays; and ray sorting circuitry/logic to sort the rays into a plurality of ray queues based, at least in part, on the approximate ray direction data.

Example 2. The apparatus of example 1 wherein the approximate ray direction data comprises a quantized direction value associated with each ray of the plurality of rays.

Example 3. The apparatus of example 2 wherein the quantized direction value for each ray comprises first data indicating a side of a volume intersected by the ray and second data comprising quantized intersection coordinates of an intersection between the ray and the side of the volume.

Example 4. The apparatus of example 2 wherein the ray sorting circuitry/logic is to group one or more of the plurality of rays into the plurality of ray queues based on a combination of the quantized direction value and a shader record key associated with the ray.

Example 5. The apparatus of example 4 wherein the ray sorting circuitry/logic is to first attempt to match a ray with a ray queue using both the quantized ray direction value and the shader record key and to attempt to match the ray with a ray queue using only the shader record key only when a match is not found.

Example 6. The apparatus of example 5 wherein when a match is not found using the both the quantized ray direction value and the shader record key, the ray sorting circuitry/logic is to attempt to allocate a new ray queue containing the ray.

Example 7. The apparatus of example 6 wherein the sorting circuitry/logic is to attempt to match the ray with a ray queue using only the shader record key only after determining that the new ray queue cannot be allocated.

Example 8. The apparatus of example 1 further comprising: a ray dispatcher to dispatch the plurality of rays in groups defined by the ray queues in which the rays are stored.

Example 9. The apparatus of example 1 further comprising: ray traversal circuitry to traverse one or more of the plurality of rays through a bounding volume hierarchy; and ray intersection circuitry to determine intersections between one or more of the plurality of rays and one or more objects in a scene.

Example 10. A method comprising: generating a plurality of rays; determining approximate ray direction data for each of the plurality of rays; and sorting the rays into a plurality of ray queues based, at least in part, on the approximate ray direction data.

Example 11. The method of example 10 wherein the approximate ray direction data comprises a quantized direction value associated with each ray of the plurality of rays.

Example 12. The method of example 11 wherein the quantized direction value for each ray comprises first data indicating a side of a volume intersected by the ray and second data comprising quantized intersection coordinates of an intersection between the ray and the side of the volume.

Example 13. The method of example 11 wherein sorting further comprises: grouping the plurality of rays into the plurality of ray queues based on a combination of the quantized direction value and a shader record key associated with the ray.

Example 14. The method of example 13 further comprising: initially attempting to match a ray with a ray queue using both the quantized ray direction value and the shader record key; and attempting to match the ray with a ray queue using only the shader record key only when a match is not found.

Example 15. The method of example 14 further comprising: attempting to allocate a new ray queue containing the ray when a match is not found using the both the quantized ray direction value and the shader record key.

Example 16. The method of example 15 wherein attempting to match the ray with a ray queue using only the shader record key is performed only after determining that the new ray queue cannot be allocated.

Example 17. The method of example 10 further comprising: dispatching the plurality of rays in groups defined by the ray queues in which the rays are stored.

Example 18. The method of example 10 further comprising: traversing one or more of the plurality of rays through a bounding volume hierarchy; and determining intersections between one or more of the plurality of rays and one or more objects in a scene.

Example 19. A machine-readable medium having program code stored thereon which, when executed by a machine, causes the machine to perform the operations of: generating a plurality of rays; determining approximate ray direction data for each of the plurality of rays; and sorting the rays into a plurality of ray queues based, at least in part, on the approximate ray direction data.

Example 20. The machine-readable medium of example 19 wherein the approximate ray direction data comprises a quantized direction value associated with each ray of the plurality of rays.

Example 21. The machine-readable medium of example 20 wherein the quantized direction value for each ray comprises first data indicating a side of a volume intersected by the ray and second data comprising quantized intersection coordinates of an intersection between the ray and the side of the volume.

Example 22. The machine-readable medium of example 20 wherein sorting further comprises: grouping the plurality of rays into the plurality of ray queues based on a combination of the quantized direction value and a shader record key associated with the ray.

Example 23. The machine-readable medium of example 22 further comprising program code to cause the machine to perform the operations of: initially attempting to match a ray with a ray queue using both the quantized ray direction value and the shader record key; and attempting to match the ray with a ray queue using only the shader record key only when a match is not found.

Example 24. The machine-readable medium of example 23 further comprising: attempting to allocate a new ray queue containing the ray when a match is not found using the both the quantized ray direction value and the shader record key.

Example 25. The machine-readable medium of example 24 wherein attempting to match the ray with a ray queue using only the shader record key is performed only after determining that the new ray queue cannot be allocated.

Example 26. The machine-readable medium of example 19 further comprising program code to cause the machine to perform the operations of: dispatching the plurality of rays in groups defined by the ray queues in which the rays are stored.

Example 27. The machine-readable medium of example 19 further comprising program code to cause the machine to perform the operations of: traversing one or more of the plurality of rays through a bounding volume hierarchy; and determining intersections between one or more of the plurality of rays and one or more objects in a scene.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
   execution circuitry coupled to non-transitory machine-readable storage medium that stores instructions, which when executed by the execution circuitry, are capable of performing:
   generating a plurality of rays;
   generating ray direction data to estimate directions for the plurality of rays, wherein generation of the ray direction data comprises performing a ray and bounding box intersection test, and encoding a result of the ray and bounding box intersection test in a plurality of bits to generate the ray direction data; and
   sorting the plurality of rays into a plurality of ray groups based on the ray direction data.

2. The apparatus of claim 1, wherein sorting the plurality of rays is based on a direction sort key comprising the plurality of bits.

3. The apparatus of claim 2, wherein the direction sort key comprises intersection coordinates determined based on the ray and bounding box intersection test.

4. The apparatus of claim 3, wherein precision of the intersection coordinates is reduced to fit within a specified size of the direction sort key.

5. The apparatus of claim 1, wherein secondary rays based on the ray and bounding box intersection test are sorted into a same group.

6. The apparatus of claim 1, wherein sorting the plurality of rays is further based on a shader record identifier.

7. The apparatus of claim 1, wherein rays within a ray group of the plurality of ray groups are deemed to converge on a same intersection point.

8. The apparatus of claim 1, wherein rays within a ray group of the plurality of ray groups are stored in a queue.

9. A method comprising:
generating a plurality of rays;
generating ray direction data to estimate directions for the plurality of rays, wherein generation of the ray direction data comprises performing a ray and bounding box intersection test, and encoding a result of the ray and bounding box intersection test in a plurality of bits to generate the ray direction data; and
sorting the plurality of rays into a plurality of ray groups based on the ray direction data.

10. The method of claim 9, wherein secondary rays based on the ray and bounding box intersection test are sorted into a same group.

11. The method of claim 9, wherein sorting the plurality of rays is further based on a shader record identifier.

12. The method of claim 9, wherein rays within a ray group of the plurality of ray groups are stored in a queue.

13. A non-transitory machine-readable medium having program code stored thereon which, when executed by a machine, are capable of causing the machine to perform:
generating a plurality of rays;
generating ray direction data to estimate directions for the plurality of rays, wherein generation of the ray direction data comprises performing a ray and bounding box intersection test, and encoding a result of the ray and bounding box intersection test in a plurality of bits to generate the ray direction data; and
sorting the plurality of rays into a plurality of ray groups based on the ray direction data.

14. The non-transitory machine-readable medium of claim 13, wherein sorting the plurality of rays is further based on a shader record identifier.

15. The non-transitory machine-readable medium of claim 13, wherein rays within a ray group of the plurality of ray groups are stored in a queue.

* * * * *